(12) United States Patent
Lee

(10) Patent No.: US 12,507,538 B2
(45) Date of Patent: Dec. 23, 2025

(54) DISPLAY APPARATUS

(71) Applicant: SAMSUNG DISPLAY CO., LTD., Yongin-si (KR)

(72) Inventor: Hyeonbum Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 862 days.

(21) Appl. No.: 17/582,296

(22) Filed: Jan. 24, 2022

(65) Prior Publication Data
US 2022/0344441 A1    Oct. 27, 2022

(30) Foreign Application Priority Data

Apr. 22, 2021   (KR) ........................ 10-2021-0052532

(51) Int. Cl.
| | |
|---|---|
| *H10K 59/124* | (2023.01) |
| *G06F 3/044* | (2006.01) |
| *H10K 59/12* | (2023.01) |
| *H10K 59/131* | (2023.01) |
| *H10K 59/40* | (2023.01) |
| *H10K 59/80* | (2023.01) |
| *H10K 77/10* | (2023.01) |
| *H10K 102/00* | (2023.01) |

(52) U.S. Cl.
CPC ......... *H10K 59/124* (2023.02); *G06F 3/0445* (2019.05); *H10K 59/12* (2023.02); *H10K 59/131* (2023.02); *H10K 59/873* (2023.02); *G06F 2203/04102* (2013.01); *H10K 59/40* (2023.02); *H10K 77/111* (2023.02); *H10K 2102/311* (2023.02)

(58) Field of Classification Search
None
See application file for complete search history.

(56) References Cited

U.S. PATENT DOCUMENTS

| | | |
|---|---|---|
| 9,659,966 B2 | 5/2017 | Kwak et al. |
| 10,361,385 B2 | 7/2019 | Choi et al. |
| 10,475,874 B2 | 11/2019 | Rhe et al. |

(Continued)

FOREIGN PATENT DOCUMENTS

| | | |
|---|---|---|
| KR | 20140099139 A | 8/2014 |
| KR | 1020170096089 A | 8/2017 |

(Continued)

*Primary Examiner* — Nishath Yasmeen
(74) *Attorney, Agent, or Firm* — CANTOR COLBURN LLP

(57) ABSTRACT

A display apparatus in which wiring in a bending area cracks less includes a substrate including a display area, a peripheral area, and a bending area which is at least a portion of the peripheral area that is bendable, an inorganic insulating layer arranged on the substrate and overlapping the display area and the peripheral area and defining an opening, a pixel circuit in the display area, a planarization insulating layer on the pixel circuit, a pad portion on an end of the peripheral area, a first organic layer arranged in the bending area and including the same material as a material included in the planarization insulating layer, and a connection wire extending on the pad portion. The connection wire includes first metal patterns under the first organic layer, and second metal patterns on the first organic layer and electrically connected to the first metal patterns.

22 Claims, 21 Drawing Sheets

(56) References Cited

U.S. PATENT DOCUMENTS

| | | | |
|---|---|---|---|
| 10,930,880 B2 | 2/2021 | Kim et al. | |
| 2018/0337223 A1* | 11/2018 | Lee | H10D 86/443 |
| 2019/0164995 A1* | 5/2019 | Lee | H10D 86/411 |
| 2020/0279871 A1* | 9/2020 | Lee | H10K 59/131 |
| 2021/0005845 A1 | 1/2021 | Kim et al. | |

FOREIGN PATENT DOCUMENTS

| | | |
|---|---|---|
| KR | 1020180059633 A | 6/2018 |
| KR | 20200140439 A | 12/2020 |
| KR | 1020210004006 A | 1/2021 |

* cited by examiner

DISPLAY APPARATUS

This application claims priority to Korean Patent Application No. 10-2021-0052532, filed on Apr. 22, 2021, and all the benefits accruing therefrom under 35 U.S.C. § 119, the content of which in its entirety is herein incorporated by reference.

BACKGROUND

1. Field

Embodiments relate to display apparatuses, and more particularly, to a display apparatus in which wiring in a bending area cracks less.

2. Description of the Related Art

Organic light-emitting display apparatuses have a larger viewing angle, better contrast characteristics, and a faster response speed than other display apparatuses, and thus, have drawn the attention as a next-generation display apparatus.

In general, organic light-emitting display apparatuses include a thin-film transistor and an organic light emitting diode, which is a display element, formed on a substrate, and the organic light emitting diode itself emits light. Such organic light-emitting display apparatuses may be used for small products, such as mobile phones, and may also be used for large products, such as televisions.

SUMMARY

Embodiments include a display apparatus in which wiring in a bending area cracks less. However, the embodiments are only examples, and the scope of the invention is not limited thereto.

Additional features will be set forth in part in the description which follows and, in part, will be apparent from the description, or may be learned by practice of the presented embodiments of the invention According to an embodiment of the invention, a display apparatus includes a substrate including a display area, a peripheral area surrounding the display area and extending to one side, and a bending area which is at least a portion of the peripheral area that is bendable; an inorganic insulating layer arranged on the substrate and overlapping the display area and the peripheral area and defining an opening corresponding to the bending area, a pixel circuit in the display area, a display element on the pixel circuit, a contact metal electrically connecting the pixel circuit to the display element, an optical functional layer on the display element and including a first layer defining an opening pattern corresponding to the display element and a second layer arranged on the first layer and extending to the peripheral area and covering the bending area, a pad portion on an end of the peripheral area, a first organic layer in the bending area, and a connection wire extending on the pad portion beyond the display area and the bending area, and at least partially including the same material as a material of the contact metal. The connection wire includes first metal patterns under the first organic layer, and second metal patterns on the first organic layer and electrically connected to the first metal patterns via contact holes that penetrate through the first organic layer.

In an embodiment, the opening may include a first surface which is slanted and a second surface facing the substrate, and at least a portion of the connection wire may contact the first surface and the second surface.

In an embodiment, the display apparatus may further include a planarization insulating layer on the pixel circuit. The planarization insulating layer may include a first planarization insulating layer, and a second planarization insulating layer on the first planarization insulating layer, and the first organic layer may include the same material as a material included in the first planarization insulating layer.

In an embodiment, the display apparatus may further include a buried organic layer arranged on the connection wire in correspondence with the opening and filling at least a portion of the opening.

In an embodiment, a first height from a surface of the opening facing the substrate to a surface of the buried organic layer opposite to the surface of the opening may be greater than a second height from the surface of the opening to a surface of the inorganic insulating layer opposite to the surface of the opening.

In an embodiment, the buried organic layer may include the same material as a material included in the second planarization insulating layer.

In an embodiment, the display apparatus may further include a second organic layer arranged on the buried organic layer in correspondence with the opening.

In an embodiment, a third height from the surface of the opening facing the substrate to a surface of the second organic layer opposite to the surface of the opening may be greater than the second height from the surface of the opening to a surface of the inorganic insulating layer opposite to the surface of the opening.

In an embodiment, the display apparatus may further include a pixel defining layer arranged on the planarization insulating layer and defining an emission area through an opening, and the second organic layer may include the same material as a material included in the pixel defining layer.

In an embodiment, the display apparatus may further include a planarization insulating layer on the pixel circuit, a pixel defining layer arranged on the planarization insulating layer and defining an emission area through an opening, and a buried organic layer arranged under the connection wire in correspondence with the opening of the inorganic insulating layer and filling at least a portion of the opening of the inorganic insulating layer. The first organic layer may include the same material as a material included in the pixel defining layer, and the buried organic layer may include the same material as a material included in the planarization insulating layer.

In an embodiment, the pixel circuit may include a thin-film transistor and a storage capacitor. The thin-film transistor may include a semiconductor layer, a gate electrode at least partially overlapping the semiconductor layer, and an electrode layer on the gate electrode. The first metal patterns may include the same material as a material included in the electrode layer, and the second metal patterns may include the same material as a material included in the contact metal.

In an embodiment, the display apparatus may further include a touch sensing layer on the display element. The touch sensing layer may include a first insulating layer, a first conductive layer, a second conductive layer, and a second insulating layer between the first conductive layer and the second conductive layer. The first metal patterns may include the same material as a material included in the contact metal, and the second metal patterns may include the same material as a material included in the first conductive layer.

In an embodiment, the first layer may cover the bending area.

In an embodiment, the display apparatus may further include a touch sensing layer on the display element. The touch sensing layer may include a first insulating layer, a first conductive layer, a second conductive layer, and a second insulating layer between the first conductive layer and the second conductive layer, and the second insulating layer may include an organic insulating material and may cover the bending area.

In an embodiment, the first insulating layer may include an organic insulating material and may cover the bending area.

In an embodiment, the display apparatus may further include a stress reduction layer arranged on the optical functional layer corresponding to the bending area.

In an embodiment, the first metal patterns may be arranged in a first direction, and the first organic layer may expose at least respective portions of the first metal patterns via the contact holes.

In an embodiment, the first organic layer may cover respective edges of the first metal patterns.

In an embodiment, the second metal patterns may be arranged alternately with the first metal patterns in the first direction.

In an embodiment, the first metal patterns may include a plurality of metal islands spaced apart from one another, and the second metal patterns may include a plurality of metal bridges spaced apart from one another. The plurality of metal islands may be connected to one another by the plurality of metal bridges.

In an embodiment, one end of each of the plurality of metal bridges may be connected to one metal island, and an opposite end of each of the plurality of metal bridges may be connected to another metal island adjacent to the one metal island.

In an embodiment, the plurality of metal bridges may include first bridges and second bridges spaced apart from each other with the plurality of metal islands between the first and second bridges.

BRIEF DESCRIPTION OF THE DRAWINGS

The above and other embodiments, features, and advantages of the invention will be more apparent from the following description taken in conjunction with the accompanying drawings, in which.

DETAILED DESCRIPTION

Figure 1:
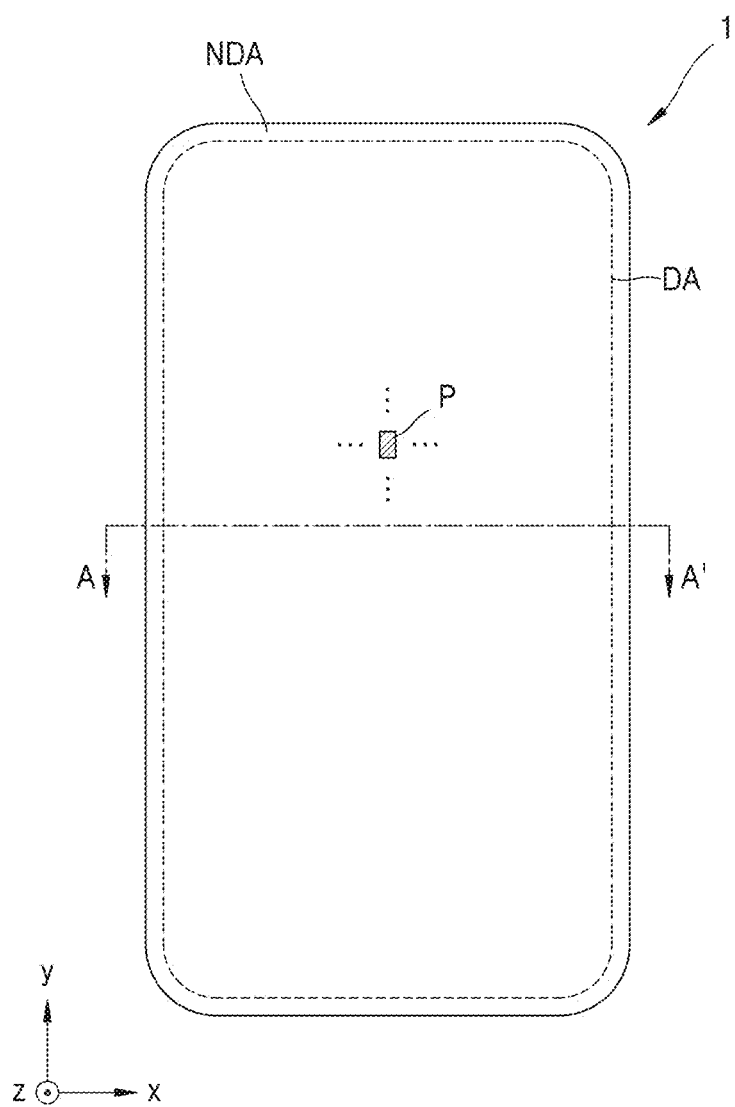
FIG. 1 is a schematic plan view of an embodiment of a portion of a display apparatus.

Reference will now be made in detail to embodiments, examples of which are illustrated in the accompanying drawings, where like reference numerals refer to like elements throughout. In this regard, the embodiments may have different forms and should not be construed as being limited to the descriptions set forth herein. Accordingly, the embodiments are merely described below, by referring to the drawing figures, to explain features of the description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. Hereinafter, effects and features of the invention and a method for accomplishing them will be described more fully with reference to the accompanying drawings, in which embodiments of the invention are shown. The invention may, however, be embodied in many different forms and should not be construed as limited to the embodiments set forth herein.

Embodiments of the invention will be described below in more detail with reference to the accompanying drawings. Those components that are the same as or are in correspondence with each other are rendered the same reference numeral regardless of the figure number, and redundant explanations are omitted.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

When a layer, region, or component is referred to as being "formed on" another layer, region, or component, it can be directly or indirectly formed on the other layer, region, or component. That is, for example, intervening layers, regions, or components may be present.

When a layer, region, or component is referred to as being "connected" or "coupled" to another layer, region, or component, it can be directly connected or coupled to the other layer, region, or/and component or intervening layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present.

In the specification, "A and/or B" represents A or B, or A and B. The expression "at least one of A and B" indicates only A, only B, both A and B, or variations thereof.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Sizes of elements in the drawings may be exaggerated for convenience of explanation. For example, since sizes and thicknesses of components in the drawings are arbitrarily illustrated for convenience of explanation, the invention is not limited thereto.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a schematic plan view of an embodiment of a portion of a display apparatus 1.

Referring to FIG. 1, the display apparatus 1 includes a display area DA and a peripheral area NDA outside the display area DA. A plurality of pixels P each including a display element may be arranged in the display area DA, and the display apparatus 1 may provide an image by light that is emitted by the plurality of pixels P arranged in the display area DA. The peripheral area NDA is a non-display area where no display elements are arranged, and the display area DA may be entirely surrounded by the peripheral area NDA.

Although FIG. 1 illustrates the display apparatus 1 including a flat display surface, the invention is not limited thereto. In another embodiment, the display apparatus 1 may include a three-dimensional ("3D") display surface or a curved display surface.

When the display apparatus 1 includes a 3D display surface, the display apparatus 1 may include a plurality of display areas pointing in different directions, and, for example, may include a display surface in the form of a polyprism. In another embodiment, when the display apparatus 1 includes a curved display surface, the display apparatus 1 may be implemented in various types, such as flexible, foldable, and rollable display apparatuses.

In an embodiment, FIG. 1 illustrates a display apparatus 1 applicable to mobile phones. Although now shown in the drawings, electronic modules, a camera module, a power supply module, or the like disposed (e.g., mounted) on a main board may be arranged in a bracket/case or the like together with the display apparatus 1, thereby constituting a mobile phone. The display apparatus 1 in an embodiment is applicable to not only large-sized electronic apparatuses, such as televisions and monitors, but also small- and medium-sized electronic apparatuses, such as tablets, automobile navigation devices, game players, and smart watches.

FIG. 1 illustrates a case where the display area DA of the display apparatus 1 has a shape of an edge-rounded rectangle. However, in another embodiment, the shape of the display area DA may be a circle, an oval, or a polygon such as a triangle or a pentagon.

Although an organic light-emitting display apparatus will now be illustrated and described as the display apparatus 1 in an embodiment, display apparatuses according to the invention are not limited thereto. In another embodiment, the display apparatus 1 may be an inorganic light-emitting display, a quantum dot light-emitting display, or the like. In an embodiment, an emission layer of a display element included in the display apparatus 1 may include an organic material, an inorganic material, quantum dots, an organic material and quantum dots, or an inorganic material and quantum dots, for example.

Figure 2A:
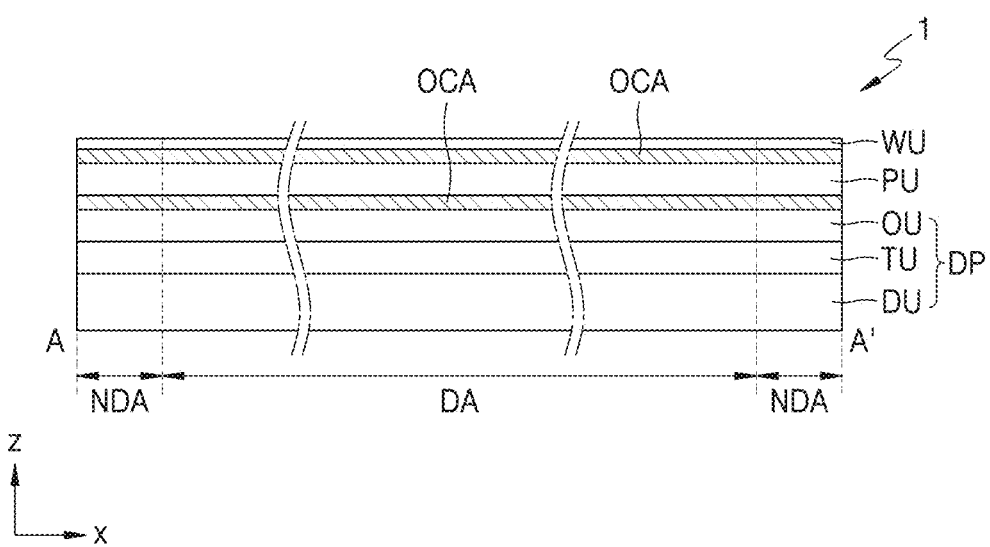
FIGS. 2A and 2B are cross-sectional views of the display apparatus of FIG. 1 taken along line A-A.
Figure 2B:
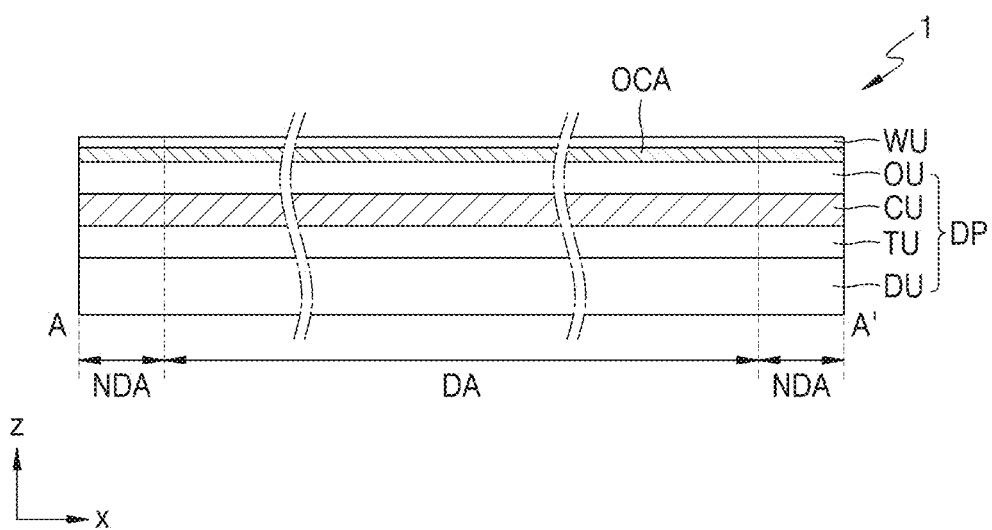
Figure 3:
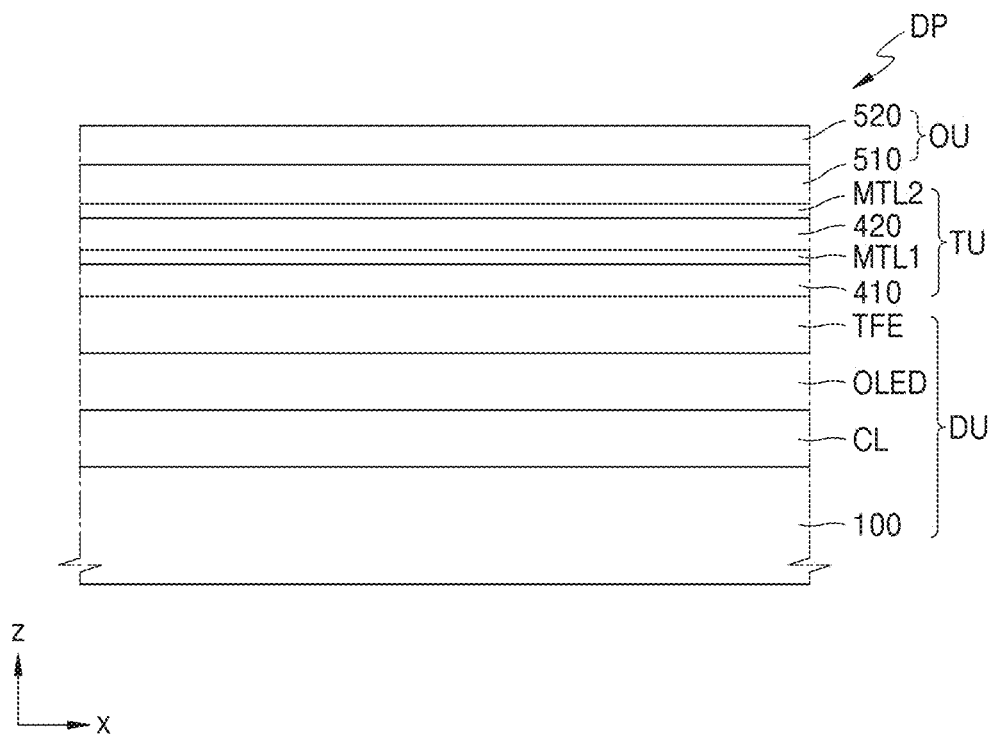
FIG. 3 is a schematic plan view of an embodiment of a portion of a display apparatus.

FIGS. 2A and 2B are schematic cross-sectional views of the display apparatus 1 of FIG. 1 taken along line A-A', and FIG. 3 is a schematic plan view of an embodiment of a portion of the display apparatus 1.

Referring to FIG. 2A, the display apparatus 1 in an embodiment may include a display layer DU, an touch sensing layer TU, an optical functional layer OU, a polarization layer PU, and a window layer WU. At least some of the display layer DU, the touch sensing layer TU, the optical functional layer OU, the polarization layer PU, and the window layer WU may be formed or provided by consecutive processes or may be combined with each other via an adhesion member. FIG. 2A illustrates an optically clear adhesion member OCA as the adhesion member. An adhesion member to be described hereinafter may include a typical adhesive. In an embodiment, the polarization layer PU and the window layer WU may be replaced by other components or may be omitted.

In an embodiment, the touch sensing layer TU is arranged directly on the display layer DU. In the specification, "A component B is arranged directly on a component A" means that there are no adhesion layers/adhesion members arranged between the components A and B. The component B is formed or disposed on a base surface of the component A via a consecutive process after the component A is formed or provided.

The display layer DU, the touch sensing layer TU arranged directly on the display layer DU, and the optical functional layer OU may be defined as a display panel DP. In an embodiment, as shown in FIG. 2A, optically clear adhesion members OCA may be arranged between the display panel DP and the polarization layer PU and between the polarization layer PU and the window layer WU, respectively.

In another embodiment, as shown in FIG. 2B, the display panel DP may include a color filter layer CU. The color filter layer CU may be arranged between the touch sensing layer TU and the optical functional layer OU. The color filter layer CU may include a color filter included to correspond to a light-emission area of each pixel P, and a light-shielding layer included to correspond to a non-light-emission area between pixels P. In an embodiment, no optically clear adhesion member OCA may be between the color filter layer CU and the display panel DP, and the color filter layer CU may be directly on the display panel DP.

The display layer DU generates an image, and the touch sensing layer TU obtains coordinate information of an external input (e.g., a touch event). Although not illustrated separately, the display panel DP in an embodiment may further include a protection member arranged on a lower surface of the display layer DU. The protection member and the display layer DU may be combined with each other via an adhesion member.

The optical functional layer OU may improve light efficiency. The optical functional layer OU may improve, for example, the front light efficiency and/or side visibility of light that is emitted by an organic light-emitting diode OLED.

The polarization layer PU reduces the reflectivity of external light that is incident thereon from the top of the window layer WU. The polarization layer PU in an embodiment may include a phase retarder and a polarizer. The phase retarder may be of a film type or liquid coating type, and may include a $\lambda/2$ phase retarder and/or a $\lambda/4$ phase retarder. The polarizer may also be of a film type or liquid coating type. The film type may include a stretchable synthetic resin film, and the liquid coating type may include liquid crystals arranged in a predetermined arrangement. The phase retarder and the polarizer may further include protective films, respectively. The phase retarder and the polarizer, or the protective films may be defined as a base layer of the polarization layer PU.

The display layer DU, the touch sensing layer TU, and the optical functional layer OU will now be described in detail with reference to FIG. 3.

Referring to FIG. 3, the display panel DP includes the display layer DU and the touch sensing layer TU. The display layer DU is simply illustrated to explain a stacking structure of the touch sensing layer TU. The polarization layer PU of FIG. 2A and the window layer WU of FIG. 2A, which may be arranged on the touch sensing layer TU, are not illustrated.

Figure 6:
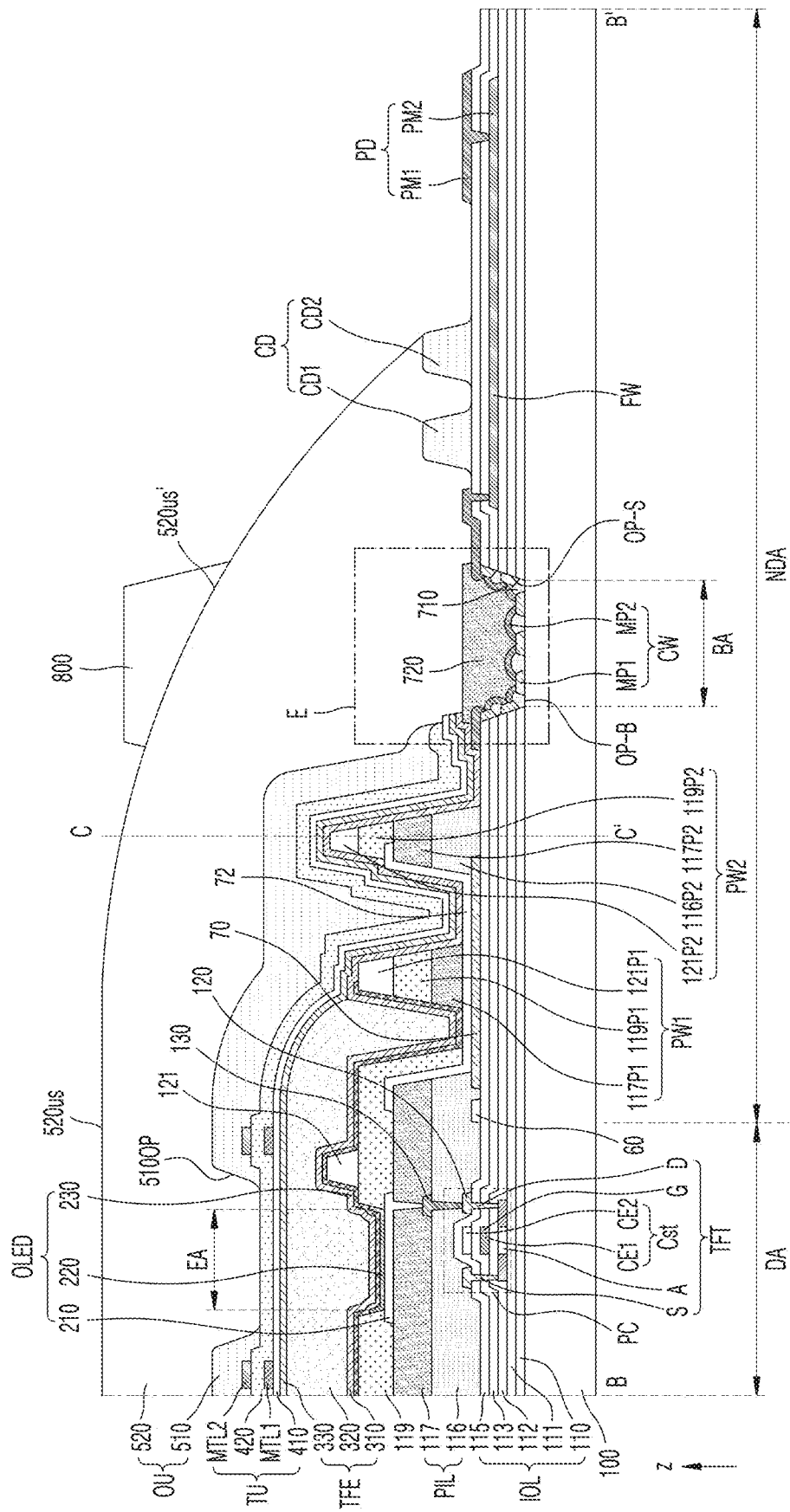
FIG. 6 is a schematic cross-sectional view of an embodiment of a portion of a display apparatus.

The display layer DU may be obtained by sequentially arranging a circuit layer CL, an organic light-emitting diode OLED, and a thin-film encapsulation layer TFE on a substrate 100. The touch sensing layer TU may be arranged directly on the thin-film encapsulation layer TFE. The thin-film encapsulation layer TFE includes at least one organic encapsulation layer 320, as shown in FIG. 6, which will be described later, and thus may provide a flatter base surface. Accordingly, even when the components of the touch sensing layer TU, which will be described later, are formed or provided by consecutive processes, a defect rate may be reduced.

The touch sensing layer TU may have a multi-layered structure. The touch sensing layer TU includes a detection electrode, a signal line (or trace line) connected to the detection electrode, and at least one insulating layer. The touch sensing layer TU may sense an external input according to, for example, an electrostatic capacitive method. An operation method of the touch sensing layer TU is not particularly limited in the invention. In an embodiment, the touch sensing layer TU may sense an external input according to an electromagnetic induction method or a pressure detection method.

As shown in FIG. 3, the touch sensing layer TU in an embodiment may include a first insulating layer 410, a first conductive layer MTL1, a second insulating layer 420, and a second conductive layer MTL2.

In an embodiment, each of the first conductive layer MTL1 and the second conductive layer MTL2 may have a single-layered structure or a stacked multi-layered structure, for example. A conductive layer having a single-layered structure may include a metal layer or a transparent conductive layer. The metal layer may include molybdenum, silver, titanium, copper, aluminum, and an alloy thereof. In an embodiment, the transparent conductive layer may include a transparent conductive oxide such as indium tin oxide ("ITO"), indium zinc oxide ("IZO"), zinc oxide (ZnO), and/or indium tin zinc oxide ("ITZO"). In an alternative embodiment, the transparent conductive layer may include a conductive polymer (e.g., poly-(3,4)-ethylenedihydroxy thiophene ("PEDOT")), metal nanowires, graphene, and/or the like.

A conductive layer having a multi-layered structure may include a plurality of metal layers. In an embodiment, the plurality of metal layers may have, for example, a three-layered structure of titanium/aluminum/titanium (Ti/Al/Ti). The conductive layer having a multi-layered structure may include at least one metal layer and/or at least one transparent conductive layer.

Each of the first conductive layer MTL1 and the second conductive layer MTL2 includes a plurality of patterns. It may be hereinafter understood that the first conductive layer MTL1 includes first conductive patterns, and that the second conductive layer MTL2 includes second conductive patterns. The first conductive patterns and the second conductive patterns may constitute a detection electrode shown in FIG. 6.

Each of the first insulating layer 410 and the second insulating layer 420 may have a single-layered or multi-layered structure. Each of the first insulating layer 410 and the second insulating layer 420 may include an inorganic material or a composite material. In an embodiment, at least one of the first insulating layer 410 and the second insulating layer 420 may include an inorganic layer. In an embodiment, the inorganic layer may include at least one of aluminum oxide, titanium oxide, silicon oxide, silicon oxynitride, silicon nitride, zirconium oxide, and hafnium oxide, for example. In another embodiment, the first insulating layer 410 and/or the second insulating layer 420 may be replaced by an organic insulating layer.

The optical functional layer OU may be directly on the touch sensing layer TU. The optical functional layer OU may include a first layer 510 and a second layer 520 on the first layer 510. The first layer 510 and the second layer 520 may include an organic insulating material, and may have different refractive indexes from each other. In an embodiment, the refractive index of the second layer 520 may be greater than that of the first layer 510.

Figure 4:
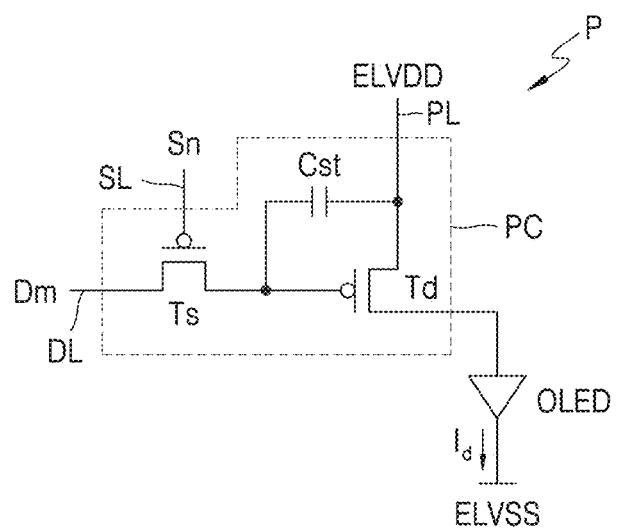
FIG. 4 is an equivalent circuit diagram of an embodiment of a pixel that may be included in a display apparatus.

FIG. 4 is an equivalent circuit diagram of an embodiment of a pixel P that may be included in the display apparatus 1.

Referring to FIG. 4, each pixel P includes a pixel circuit PC connected to a scan line SL and a data line DL, and an organic light-emitting diode OLED connected to the pixel circuit PC.

The pixel circuit PC includes a driving thin-film transistor Td, a switching thin-film transistor Ts, and a storage capacitor Cst. The switching thin-film transistor Ts is connected to the scan line SL and the data line DL, and transmits, to the driving thin-film transistor Td, a data signal Dm received via the data line DL according to a scan signal Sn received via the scan line SL.

The storage capacitor Cst is connected to the switching thin-film transistor Ts and a driving voltage line PL, and stores a voltage corresponding to a difference between a voltage received from the switching thin-film transistor Ts and a driving voltage ELVDD supplied to the driving voltage line PL.

The driving thin-film transistor Td is connected to the driving voltage line PL and the storage capacitor Cst, and may control a driving current Id flowing from the driving voltage line PL to the organic light-emitting diode OLED, in accordance with a voltage value stored in the storage capacitor Cst. The organic light-emitting diode OLED may emit light having a predetermined brightness according to the driving current Id. In an embodiment, a common voltage ELVSS may be applied to one electrode of the organic light-emitting diode OLED. In an embodiment, a voltage level of the driving voltage ELVDD may be higher than that of the common voltage ELVSS. In an embodiment, the one electrode of the organic light-emitting diode OLED may be connected to the ground to receive a voltage of 0 volt (V).

Although a case where the pixel circuit PC includes two thin-film transistors and one storage capacitor is illustrated in FIG. 4, the invention is not limited thereto. In another embodiment, the pixel circuit PC may include seven thin-film transistors and one storage capacitor. In another embodiment, the pixel circuit PC may include two or more storage capacitors.

Figure 5:
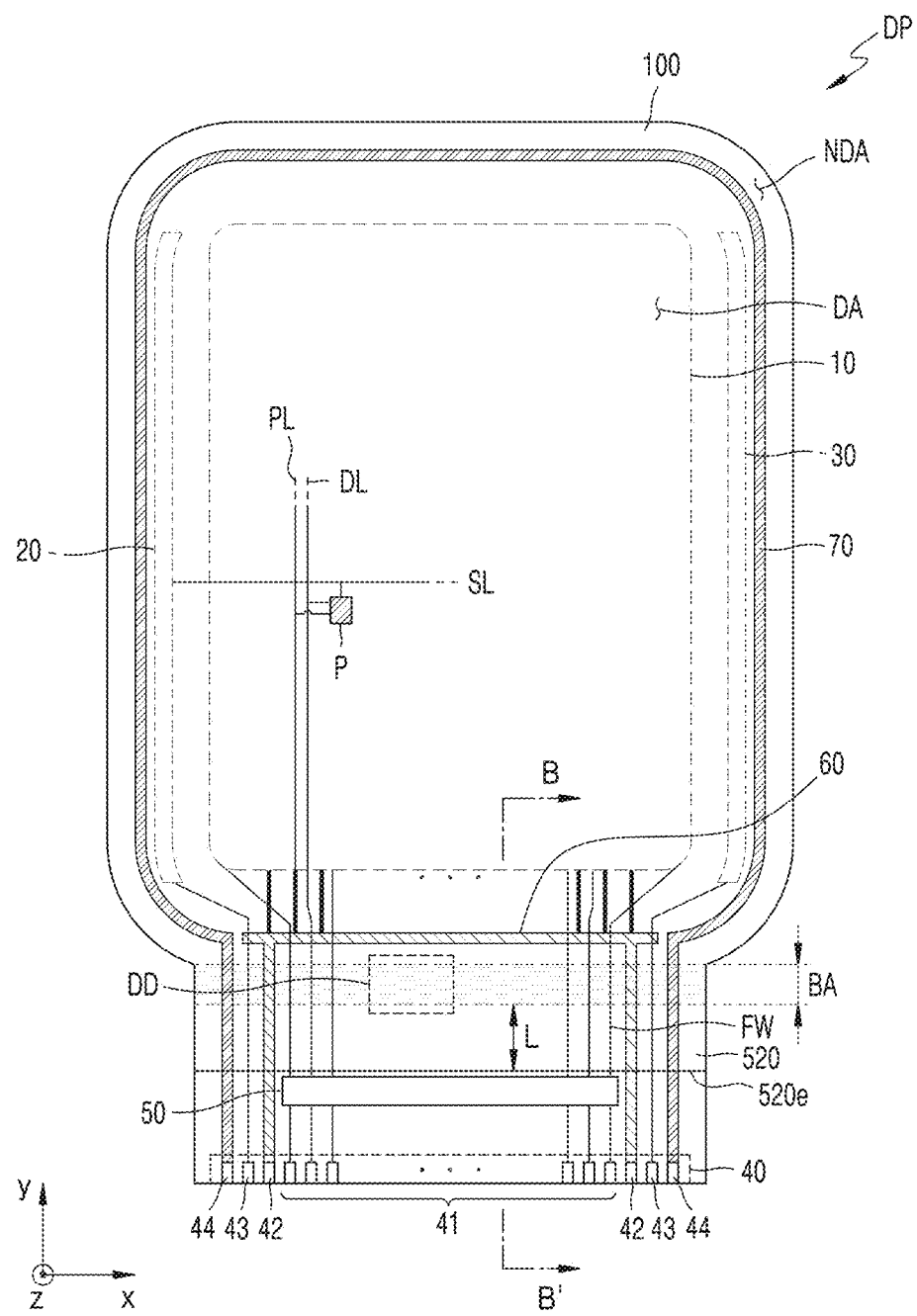
FIG. 5 is a schematic plan view of a display panel of the display apparatus of FIG. 1.

FIG. 5 is a schematic plan view of the display panel DP of the display apparatus 1 of FIG. 1.

Referring to FIG. 5, the display panel DP includes a display 10, first and second scan driving units 20 and 30, a terminal portion 40, a data driving unit 50, a driving voltage supply line 60, and a common voltage supply line 70 arranged on the substrate 100. Although not shown in FIG. 5, an emission-control driving unit (not shown) may be further arranged on one side of the first scan driving unit 20.

The substrate 100 may include a material, such as a glass material, a metal, or an organic material. In an embodiment, the substrate 100 may include a flexible material. In an embodiment, the substrate 100 may include a polymer resin such as polyethersulfone, polyacrylate, polyetherimide, polyethylene naphthalate, polyethylene terephthalate, polyphenylene sulfide, polyarylate, polyimide, polycarbonate, or cellulose acetate propionate, for example.

The substrate 100 may have a multi-layered structure including two layers each including a polymer resin and a barrier layer including an inorganic material (silicon oxide, silicon nitride, silicon oxynitride, amorphous silicon, or the like) between the two layers. In this way, various modifications may be made.

The substrate 100 may include the display area DA and the peripheral area NDA surrounding the display area DA. A portion of the peripheral area NDA may extend to one side (e.g., a −y direction). The terminal portion 40, the data driving unit 50, the driving voltage supply line 60, fan-out wires FW, or the like may be disposed on the extending peripheral area NDA. The substrate 100 may include a bending area BA in correspondence with a portion of the peripheral area NDA. In an embodiment, the bending area BA may be a portion of the extending peripheral area NDA, for example. The bending area BA is included to be bent such that the extending peripheral area NDA overlaps a portion of the display area DA, and thus, a width of the peripheral area NDA that is visually recognized by a user may be reduced.

The display 10 is disposed on the display area DA, and includes pixels P connected to a data line DL and the driving voltage line PL each extending in a first direction (e.g., a y direction) and a scan line SL extending in a second direction (e.g., an x direction) intersecting with the first direction (e.g., the y direction). In an embodiment, each of the pixels P may emit, for example, red, green, blue, or white light, and may include, for example, an organic light-emitting diode.

The display 10 provides a predetermined image via light emitted from the pixels P, and the display area DA is defined by the pixels P. The display 10 may approximately have a shape of a rectangle. However, according to various embodiments, the display 10 may have a shape of a polygon, a circle, or an oval, or a shape corresponding to a portion of a polygon, a circle, or an oval. In an embodiment, the display 10 may include a corner portion that generally has a quadrangular (e.g., rectangular) shape having round edges. The substrate 100, on which the display 10 is disposed, may have outer edges of which at least portions are curved.

The first and second scan driving units 20 and 30 are arranged on the peripheral area NDA of the substrate 100, and generate and transmit scan signals to each of the pixels P via the scan line SL. In an embodiment, the first scan driving unit 20 may be disposed on the left side of the display 10 and the second scan driving unit 30 may be disposed on the right side of the display 10, for example. In the illustrated embodiment, the first and second scan driving units 20 and 30 are arranged on opposite sides of the display 10, respectively. However, in another embodiment, a scan driving unit may be arranged on only one side of the display 10.

A pad portion PD of FIG. 6 may be disposed on one end of the peripheral area NDA that extends on one side thereof. The pad portion PD may be disposed on the peripheral area NDA of the substrate 100. The pad portion PD may include pads for contacting the terminal portion 40 and the data driving unit 50.

The terminal portion 40 is disposed on one end of the substrate 100 and includes a plurality of terminals 41, 42, 43, and 44. In an embodiment, the terminal portion 40 may be exposed without being covered with an insulating layer, and may be electrically connected to a controller such as a flexible printed circuit board ("PCB") or an integrated circuit ("IC") chip.

The data driving unit 50 is on the peripheral area NDA of the substrate 100, and generates and transmits a data signal to each of the pixels P via the data line DL. The data driving unit 50 may be disposed on one side of the display 10, for example, between the terminal portion 40 and the display 10. The data driving unit 50 may connect to the pad portion PD to transmit a data signal to the display panel DP. FIG. 5 illustrates an arrangement of the data driving unit 50 on the substrate 100. However, in another embodiment, the data driving unit 50 may be included on a flexible PCB that contacts the terminal portion 40.

The controller changes a plurality of image signals received from an external source into a plurality of image data signals, and transmits the plurality of image data signals to the data driving unit 50 via the terminal 41. The data driving unit 50 may generate a data signal, and the generated data signal may be transmitted to the display area DA via the fan-out wires FW. The controller may receive a vertical synchronization signal, a horizontal synchronization signal, and a clock signal to generate a control signal for controlling driving of the first and second scan driving units 20 and 30, and may transmit the generated control signal to the first and second scan driving units 20 and 30 via the terminal 43. The controller transmits a driving voltage ELVDD and a common voltage ELVSS to the driving voltage supply line 60 and the common voltage supply line 70 via the terminals 42 and 44, respectively.

The driving voltage supply line 60 is on the peripheral area NDA. In an embodiment, the driving voltage supply line 60 may be between the data driving unit 50 and the display 10, for example. The driving voltage supply line 60 provides the driving voltage ELVDD to the pixels P. The driving voltage supply line 60 may extend in the second direction (e.g., the x direction), and may be connected to the plurality of driving voltage lines PL each extending in the first direction (e.g., the y direction).

The common voltage supply line 70 is arranged on the peripheral area NDA, and provides the common voltage ELVSS to an opposite electrode 230 of FIG. 6 of an organic light-emitting diode of each pixel P. In an embodiment, the common voltage supply line 70 has a loop shape of which one side is open, and accordingly may extend along an edge of the substrate 100 with the exception of the terminal portion 40, for example.

The optical functional layer OU may be disposed on the display area DA. The optical functional layer OU may be disposed over the entire surface of the display area DA and may partially extend to the peripheral area NDA. Substantially, the optical functional layer OU is arranged on the touch sensing layer TU of FIGS. 2A and 3, and may improve the luminescent efficiency and side visibility of the pixel P on the display area DA.

The optical functional layer OU may be arranged on the entire surface of the display area DA, and may partially extend to the peripheral area NDA. The second layer 520 of the optical functional layer OU may extend toward the peripheral area NDA. In an embodiment, the second layer 520 may extend toward the peripheral area NDA so as to overlap the bending area BA of the substrate 100.

The second layer 520 may extend over the peripheral area NDA while covering the bending area BA, and may not overlap the data driving unit 50. An end 520e of the second layer 520 may be between the bending area BA and the data driving unit 50. When the second layer 520 extends over the peripheral area NDA, the end 520e of the second layer 520 may be included maximally adjacent to the data driving unit 50 in order to sufficiently secure a width L extending from the bending area BA. In an embodiment, the width L between one end of the bending area BA facing the data driving unit 50 and the end 520e of the second layer 520 needs to be secured by at least about 1 millimeter (mm), for example, about 4 mm to about 5 mm, for example.

FIG. 6 is a schematic cross-sectional view of an embodiment of a portion of a display apparatus. FIG. 6 corresponds to a cross-section of the display panel DP of FIG. 5 taken along line B-B' of FIG. 5.

A structure on the display area DA will be first described with reference to FIG. 6.

A barrier layer 110 may be arranged on the substrate 100. A buffer layer 111 may be arranged on the barrier layer 110. The buffer layer 111 may prevent flowing of impurities into various components arranged on the substrate 100 via the substrate 100.

The pixel circuit PC including the thin-film transistor TFT and the storage capacitor Cst may be arranged on the buffer layer 111. The thin-film transistor TFT may include a semiconductor layer A, a gate electrode G overlapping a channel region of the semiconductor layer A, and an electrode layer 120 on the gate electrode G. The electrode layer 120 may include a source electrode S and a drain electrode D respectively connected to a source region and a drain region of the semiconductor layer A. A gate insulating layer 112 may be between the semiconductor layer A and the gate electrode G, and a first inter-insulating layer 113 and a second inter-insulating layer 115 may be between the gate electrode G and the electrode layer 120.

The storage capacitor Cst and the thin-film transistor TFT may overlap each other. The storage capacitor Cst may include a first capacitor plate CE1 and a second capacitor plate CE2 overlapping each other. In an embodiment, the gate electrode G of the thin-film transistor TFT may be unitary with the first capacitor plate (also referred to as a first storage capacitor plate) CE1 of the storage capacitor Cst. The first inter-insulating layer 113 may be between the first capacitor plate CE1 and the second capacitor plate CE2.

The semiconductor layer A may include a channel region, and a source region and a drain region doped with many impurities. In an embodiment, the semiconductor layer A may include a silicon semiconductor material. In an embodiment, the semiconductor layer A may include polysilicon or amorphous silicon. In an embodiment, the semiconductor layer A may include an oxide semiconductor material. In an embodiment, a plurality of thin-film transistors TFT may be included in the pixel circuit PC, some of the plurality of thin-film transistors TFT may include a silicon semiconductor material, and the other thin-film transistors TFT may include an oxide semiconductor material. In an embodiment, when the semiconductor layer A includes an oxide semiconductor material, the semiconductor layer A may include oxide of at least one material selected from the group including indium (In), gallium (Ga), tin (Sn), zirconium (Zr), hafnium (Hf), titanium (Ti), and zinc (Zn).

The gate insulating layer 112 may include an inorganic insulating material, such as silicon oxide, silicon oxynitride, or silicon nitride, and may be a single layer or multiple layers including the inorganic insulating material.

The gate electrode GE or the first storage capacitor plate CE1 may include a low-resistance conductive material such as molybdenum (Mo), aluminum (Al), copper (Cu), and/or titanium (Ti), and may have a multi-layer or single layer structure including the aforementioned materials.

The first inter-insulating layer 113 may include an inorganic insulating material, such as silicon oxide, silicon oxynitride, or silicon nitride, and may be a single layer or multiple layers including the inorganic insulating material.

The second capacitor plate CE2 may include aluminum (Al), chromium (Cr), molybdenum (Mo), titanium (Ti), tungsten (W), and/or copper (Cu), and may have a single layer or multi-layer structure including the aforementioned materials.

The second inter-insulating layer 115 may include an inorganic insulating material, such as silicon oxide, silicon oxynitride, or silicon nitride, and may be a single layer or multiple layers including the inorganic insulating material.

The electrode layer 120 may include aluminum (Al), molybdenum (Mo), titanium (Ti), tungsten (W), and/or copper (Cu), and may have a single layer or multi-layer structure including the aforementioned materials. In an embodiment, the electrode layer 120 may have a three-layered structure of Ti layer/Al layer/Ti layer, for example.

A planarization insulating layer PIL may be arranged on the pixel circuit PC. The planarization insulating layer PIL may include a different material from at least one inorganic insulating layer IOL, for example, the barrier layer 110, the buffer layer 111, the gate insulating layer 112, the first inter-insulating layer 113, and the second inter-insulating layer 115.

The planarization insulating layer PIL may include a first planarization insulating layer 116 and a second planarization insulating layer 117. In an embodiment, the first planarization insulating layer 116 may include an organic insulating material, such as acryl, benzocyclobutene ("BCB"), polyimide, or hexamethyldisiloxane ("HMDSO").

The second planarization insulating layer 117 may be arranged on the first planarization insulating layer 116. In an embodiment, the second planarization insulating layer 117 may include an organic insulating material, such as acryl, BCB, polyimide, or HMDSO. A contact metal 130 may be disposed on the first planarization insulating layer 116, and the thin-film transistor TFT and a pixel electrode 210 may be electrically connected to each other via the contact metal 130.

The pixel electrode 210 may be disposed on the second planarization insulating layer 117. In an embodiment, the pixel electrode 210 may include a reflection layer including silver (Ag), magnesium (Mg), aluminum (Al), platinum (Pt), palladium (Pd), gold (Au), nickel (Ni), neodymium (Nd), iridium (Ir), chromium (Cr), or any combinations of these materials. The pixel electrode 210 may include a reflective layer including the aforementioned material, and a transparent conductive layer arranged above or/and below the reflective layer. In an embodiment, the transparent conductive layer may include ITO, IZO, zinc oxide (ZnO), indium oxide ($In_2O_3$), indium gallium oxide ("IGO"), or aluminum zinc oxide ("AZO"). In an embodiment, the pixel electrode 210 may have a three-layered structure of ITO/Ag/ITO layers that are sequentially stacked.

A pixel defining layer 119 may cover an edge of the pixel electrode 210, and an opening via which a center of the pixel electrode 210 is exposed may be defined in the pixel defining layer 119. The pixel defining layer 119 may include an organic insulating material, such as BCB, polyimide, or HMDSO. An emission area EA may be defined via the opening of the pixel defining layer 119, and red, green, or blue light may be emitted through the emission area EA. The area or width of the emission area EA may define the area or width of each pixel.

The pixel defining layer 119 may have a black color. The pixel defining layer 119 may include a light shielding material, and may have a black color. The light shielding material may include carbon black, carbon nanotubes, resin or paste including a black pigment, metal particles (e.g., nickel, aluminum, molybdenum, and an alloy thereof), metal oxide particles (e.g., chromium oxide), or metal nitride particles (e.g., chromium nitride). When the pixel defining layer 119 includes the light shielding material, external light reflection due to metal structures arranged under the pixel defining layer 119 may be reduced.

A spacer 121 may be formed or disposed on the pixel defining layer 119. The spacer 121 may prevent layers below the spacer 121 from being damaged by a mask in a process of forming an intermediate layer 220 or the like, which will be described later. In an embodiment, the spacer 121 may include the same material as the material included in the pixel defining layer 119, or may include a different material from the material included in the pixel defining layer 119. In an embodiment, when the spacer 121 includes the same material as the material included in the pixel defining layer 119, the spacer 121 and the pixel defining layer 119 may be unitary through a half-tone mask, for example. When the pixel defining layer 119 is formed or provided with a black color, the spacer 121 may also be formed or provided with a black color.

The intermediate layer 220 includes an emission layer that overlaps the pixel electrode 210. The emission layer may include an organic material. The emission layer may include a low-molecular or high-molecular weight organic material that emits light of a predetermined color. As described above, the emission layer may be formed or provided via a deposition process using a mask.

A first functional layer and a second functional layer may be arranged below and/or above the emission layer, respectively. In an embodiment, in contrast with the emission layer being patterned and arranged for each pixel, the first functional layer and the second functional layer may be unitary over the entire surface of the display area DA.

The first functional layer may be a single layer or a multi-layer. In an embodiment, when the first functional layer includes a high-molecular weight material, the first functional layer is a hole transport layer ("HTL") having a single-layered structure, and may include PEDOT and/or polyaniline ("PANI"), for example. When the first functional layer includes a low-molecular weight material, the first functional layer may include a hole injection layer ("HIL") and an HTL.

The second functional layer may be optional. In an embodiment, when the first functional layer and the emission layer include a high-molecular weight material, the second functional layer may be formed or provided, for example. The second functional layer may be a single layer or a multi-layer. The second functional layer may include an electron transport layer ("ETL") and/or an electron injection layer ("EIL").

An opposite electrode 230 may include a conductive material having a relatively low work function. In an embodiment, the opposite electrode 230 may include a (semi)transparent layer including, for example, silver (Ag), magnesium (Mg), aluminum (Al), nickel (Ni), chromium (Cr), lithium (Li), calcium (Ca) or an alloy of these materials, for example. In an alternative embodiment, the opposite electrode 230 may further include a layer, such as ITO, IZO, ZnO, or $In_2O_3$, on the (semi)transparent layer including any of the above-described materials. In an embodiment, the opposite electrode 230 may include Ag and Mg.

The pixel electrode 210, the intermediate layer 220, and the opposite electrode 230 sequentially stacked on one another may constitute a light-emitting diode, for example, an organic light-emitting diode OLED. A display layer including the pixel circuit PC, the insulating layers, and the organic light-emitting diode OLED may be covered with the thin-film encapsulation layer TFE.

The thin-film encapsulation layer TFE may include first and second inorganic encapsulation layers 310 and 330 and an organic encapsulation layer 320 therebetween.

Each of the first and second inorganic encapsulation layers 310 and 330 may include one or more inorganic insulating materials. The inorganic insulating materials may include aluminum oxide, titanium oxide, tantalum oxide, hafnium oxide, zinc oxide, silicon oxide, silicon nitride, and/or silicon oxynitride. The first and second inorganic encapsulation layers 310 and 330 may be formed or provided by chemical vapor deposition.

The organic encapsulation layer 320 may include a polymer-based material. Examples of the polymer-based material may include an acrylic resin, an epoxy-based resin, polyimide, and/or polyethylene. In an embodiment, the organic encapsulation layer 320 may include an acrylic resin, for example, polymethyl methacrylate or polyacrylic acid. The organic encapsulation layer 320 may be formed or provided by curing a monomer or coating a polymer.

The thin-film encapsulation layer TFE may entirely cover the display area DA, and extend toward the peripheral area NDA to cover a portion of the peripheral area NDA. The thin-film encapsulation layer TFE may extend to the outside of the driving voltage supply line 60.

The touch sensing layer TU may include the first conductive layer MTL1 and the second conductive layer MTL2 each including, for example, a detection electrode and/or a trace line. The first insulating layer 410 may be between the thin-film encapsulation layer TFE and the first conductive layer MTL1, and the second insulating layer 420 may be between the first conductive layer MTL1 and the second conductive layer MTL2.

Each of the first conductive layer MTL1 and the second conductive layer MTL2 may include a conductive material. The conductive material may include molybdenum (Mo), aluminum (Al), copper (Cu), and/or titanium (Ti) and may have a multi-layered or single-layered structure including the aforementioned materials. In some embodiments, each of the first conductive layer MTL1 and the second conductive layer MTL2 may have a Ti/Al/Ti structure in which a Ti layer, an Al layer, and a Ti layer are sequentially stacked on one another.

Each of the first and second insulating layers 410 and 420 may include an inorganic insulating material and/or an organic insulating material. The inorganic insulating material may include silicon oxide, silicon oxynitride, silicon nitride, and/or the like. The organic insulating material may include an acrylic organic material and an imide-based organic material.

In FIG. 6, the second insulating layer 420 extends to a second partition wall PW2. However, in another embodiment, the second insulating layer 420 may extend beyond the bending area BA and cover a portion of the peripheral area NDA.

The optical functional layer OU may be disposed on the touch sensing layer TU. The optical functional layer OU may include the first layer 510 that covers the second conductive layer MTL2 and is arranged on the second insulating layer 420, and the second layer 520 arranged on the first layer 510.

An opening pattern 5100P may be defined in the first layer 510 to correspond to the emission area EA. In an embodiment, a width of the opening pattern 5100P may be greater than that of the emission area EA, in the same direction. The opening pattern 5100P is disposed in the light extraction direction of each pixel to thereby reinforce the straightness of light emitted by the emission area EA, and thus light extraction efficiency may be improved.

To further improve the above-described light extraction efficiency, the second layer 520 having a higher refractive index than the refractive index of the first layer 510 may be further arranged on the first layer 510. The first layer 510 may include an insulating material having a first refractive index, and the second layer 520 may include an insulating material having a second refractive index.

The first refractive index of the first layer 510 may be in the range of about 1.3 to about 1.6. In an embodiment, the first refractive index of the first layer 510 may be in the range of about 1.4 to about 1.55. The first layer 510 may include, for example, (ethyl)hexyl acrylate, pentafluoropropyl acrylate, poly(ethylene glycol) dimethacrylate, ethylene glycol dimethacrylate, or the like. In an embodiment, the first layer 510 may include an acrylic organic material having a refractive index of about 1.5. In an alternative embodiment, the first layer 510 may include a material included in the organic encapsulation layer 320 of the thin-film encapsulation layer TFE. In an embodiment, the first layer 510 may include an epoxy-based organic material, and in some cases, may also include a photocurable material.

The second layer 520 may be a planarization insulating layer having a second refractive index. In an embodiment, the second refractive index of the second layer 520 may be in the range of about 1.65 to about 1.85. The second layer 520 may include, for example, polydiarylsiloxane, methyltrimethoxysilane, tetramethoxysilane, or the like. In an embodiment, the second layer 520 may include an acrylic and/or siloxane-based organic material having a refractive index of about 1.6. In another embodiment, the second layer 520 may include dispersed particles to have a high refractive index. Metal oxide particles, for example, zinc oxide (ZnOx), titanium oxide ($TiO_2$), zirconium oxide ($ZrO_2$), or barium titanate ($BaTiO_3$), may be dispersed in the second layer 520.

The first layer 510 and the second layer 520 may be arranged in the display area DA, and may entirely cover the display area DA and each extend to the peripheral area NDA. In FIG. 6, the second layer 520 covers the bending area BA. However, in another embodiment, the first layer 510 and the second layer 520 may cover the bending area BA. As the second layer 520 extends over the bending area BA and the peripheral area NDA, an upper surface 520us of the second layer 520 may be included to be approximately flat at the boundary between the display area DA and the peripheral area NDA.

According to a comparative example, when the second layer 520 does not sufficiently extend to the peripheral area NDA, a stain on a display panel may be visually recognized due to external light reflection according to a thickness deviation of the second layer 520 at an edge of the display area DA. Thus, in the display apparatus 1 in an embodiment, the second layer 520 sufficiently extends to the peripheral area NDA around the display area DA, and accordingly the upper surface 520us of the second layer 520 is included to be approximately flat at the boundary between the display area DA and the peripheral area NDA, leading to a minimization of the thickness deviation of the second layer 520. Accordingly, visual recognition of a stain at the boundary between the display area DA and the peripheral area NDA may be effectively prevented.

Referring to the peripheral area NDA, a first partition wall PW1 and a second partition wall PW2 may be arranged in a portion of the peripheral area NDA that is adjacent to the display area DA. The first partition wall PW1 and the second partition wall PW2 may be arranged to surround the display area DA. The first partition wall PW1 and the second partition wall PW2 may be arranged apart from each other. Valleys may be included between the first partition wall PW1 and the display area DA and between the first partition wall PW1 and the second partition wall PW2, respectively. The first partition wall PW1, the second partition wall PW2, and the valleys may prevent overflow of the organic encapsulation layer 320 of the thin-film encapsulation layer TFE toward an edge of the substrate 100. Accordingly, the organic encapsulation layer 320 may contact an inner surface of the first partition wall PW1 that faces the display area DA. In this case, the organic encapsulation layer 320 contacting the inner surface of the first partition wall PW1 may be understood as the first inorganic encapsulation layer 310 being between the organic encapsulation layer 320 and the first partition wall PW1 and the organic encapsulation layer 320 being in direct contact with the first inorganic encapsulation layer 310. The first inorganic encapsulation layer 310 and the second inorganic encapsulation layer 330 may be disposed on the first and second partition walls PW1 and PW2 and may extend toward the edge of the substrate 100.

In FIG. 6, the display apparatus 1 includes the first partition wall PW1 and the second partition wall PW2. However, in another embodiment, a display apparatus may include only the first partition wall PW1, or may further include a partition wall adjacent to the second partition wall PW2. The first partition wall PW1 may include a portion 117P1 of the second planarization insulating layer 117, a portion 119P1 of the pixel defining layer 119, and a portion 121P1 of the spacer 121, and the second partition wall PW2 may include a portion 116P2 of the first planarization insulating layer 116, a portion 117P2 of the second planarization insulating layer 117, a portion 119P2 of the pixel defining layer 119, and a portion 121P2 of the spacer 121. In another embodiment, the first partition wall PW1 and the second partition wall PW2 may further include respective portions of other layers, or portions of the aforementioned layers may be omitted.

The common voltage supply line 70 may be disposed outside the driving voltage supply line 60. The common voltage supply line 70 may extend below first partition wall PW1 and a portion of the second partition wall PW2. The common voltage supply line 70 may be electrically connected to the opposite electrode 230 of the organic light-emitting diode OLED via a connecting electrode 72. In an embodiment, the common voltage supply line 70 may be arranged in the same layer as the layer on which the driving voltage supply line 60 is arranged, and may include the same material as the material included in the electrode layer 120 of the thin-film transistor TFT, and the connecting electrode 72 may include the same material as the material included in the pixel electrode 210 of the organic light-emitting diode OLED.

The second layer 520 of the optical functional layer OU may extend to the peripheral area NDA and may overlap the first partition wall PW1 and the second partition wall PW2.

As described above with reference to FIG. 5, the peripheral area NDA may include the bending area BA in at least a portion thereof. The bending area BA may be arranged apart from the first partition wall PW1 and the second partition wall PW2.

An opening OP in correspondence to the bending area BA may be defined in the inorganic insulating layer IOL. In other words, the inorganic insulating layer IOL arranged in correspondence to the bending area BA may be removed from the bending area BA. In FIG. 6, the inorganic insulating layer IOL corresponding to the bending area BA is entirely removed. However, in another embodiment, the barrier layer 110 or both the barrier layer 110 and the buffer layer 111 may remain without being partially or entirely removed. Such a removal of a portion or the entirety of the inorganic insulating layer IOL disposed on the bending area BA may prevent propagation of cracks by the inorganic insulating layer IOL while the substrate 100 is being bent.

A first organic layer 710 may be in the bending area BA. The first organic layer 710 may include the same material as that included in the planarization insulating layer PIL. In an embodiment, the first organic layer 710 may include the same material as that included in the first planarization insulating layer 116. Hereinafter, when "layer A" and "layer B" include the same material in this specification, it may mean that "layer A" and "layer B" are formed or provided by the same process. Thus, when the first organic layer 710 includes the same material as that included in the first planarization insulating layer 116, the first organic layer 710 and the first planarization insulating layer 116 may be formed or provided simultaneously. A plurality of contact holes CH of FIG. 7 that penetrate through the first organic layer 710 may be defined in the first organic layer 710.

A connection wire CW may be arranged on the bending area BA. The connection wire CW may be electrically connected to each of the fan-out wires FW of FIG. 5. The fan-out wire FW may transmit a data signal to each pixel through the connection wire CW disposed on the bending area BA.

In an embodiment, the fan-out wire FW arranged in a portion of the peripheral area NDA with the exception of the bending area BA may include the same material as that included in the gate electrode G of the thin-film transistor TFT or the second capacitor plate CE2 of the storage capacitor Cst. The connection wire CW may be connected to the fan-out wire FW through a contact hole that penetrates through a portion of the inorganic insulating layer IOL.

The connection wire CW may include a first metal pattern MP1 arranged under a first organic layer 710, and a second metal pattern MP2 arranged over the first organic layer 710 and electrically connected to the first metal pattern MP1.

In an embodiment, the first metal pattern MP1 may be arranged directly on a slanting surface OP-S and a bottom surface OP-B of the opening OP. When the first metal pattern MP1 is arranged directly on the slanting surface OP-S and the bottom surface OP-B of the opening OP, stress that is applied to the connection wire CW may be reduced even when a neutral plane of the bending area BA is close to a surface of the substrate 100.

The first metal pattern MP1 may include the same material as that included in the electrode layer 120. When the first metal pattern MP1 includes the same material as that included in the electrode layer 120, the first metal pattern MP1 and the electrode layer 120 may be formed or provided simultaneously.

In an embodiment, the second metal pattern MP2 may be arranged alternately with the first metal pattern MP1 in the first direction (e.g., the y direction). The second metal pattern MP2 is arranged on the first organic layer 710 and is electrically connected to the first metal pattern MP1 through the contact holes CH of FIG. 7 that penetrate through the first organic layer 710. The second metal pattern MP2 may include the same material as that included in the contact metal 130. When the second metal pattern MP2 includes the same material as that included in the contact metal 130, the second metal pattern MP2 and the contact metal 130 may be formed or provided simultaneously.

By arranging the first organic layer 710, which is an organic insulating material, between the first metal pattern MP1 and the second metal pattern MP2, the connection wire CW may have a higher tensile force than that of the fan-out wire FW arranged in the portion of the peripheral area NDA with the exception of the bending area BA.

A buried organic layer 720 may be arranged on the connection wire CW in correspondence with the opening OP and may fill at least a portion of the opening OP. The buried organic layer 720 may reduce the stress that is applied to the connection wire CW. By adjusting a thickness and a modulus of the buried organic layer 720, a location of a stress neutral plane within a stack including all of the substrate 100 and the connection wire CW in the bending area BA may be controlled.

The buried organic layer 720 may include the same material as that included in the second planarization insulating layer 117. When the buried organic layer 720 includes the same material as that included in the second planarization insulating layer 117, the buried organic layer 720 and the second planarization insulating layer 117 may be formed or provided simultaneously.

A portion E including the connection wire CW, the first organic layer 710, and the buried organic layer 720 within the bending area BA will be described later in detail with reference to FIG. 7.

The first inorganic encapsulation layer 310 and the second inorganic encapsulation layer 330 of the thin-film encapsulation layer TFE and an end of the first insulating layer 410 of the touch sensing layer TU may each extend to the buried organic layer 720. In an embodiment, respective ends of the first inorganic encapsulation layer 310, the second inorganic encapsulation layer 330, and the first insulating layer 410 may be arranged over the buried organic layer 720 or may be disposed on the buried organic layer 720. A stress reduction layer 800 may be disposed on the second layer 520 of the optical functional layer OU. The stress reduction layer 800 may be arranged to correspond to the bending area BA, and may include an organic insulating material. The stress reduction layer 800 may move the neutral plane of the bending area BA upwards, and may compensate for moduli of the layers arranged in correspondence with the bending area BA to thereby reduce the stress that is applied to the bending area BA.

An upper surface 520$us'$ of the second layer 520 arranged under the stress reduction layer 800 may be aslant. The second layer 520 includes an organic insulating material and has a thickness that gradually decreases at one end, and the upper surface 520$us'$ of the second layer 520 corresponding to the bending area BA is a portion of the display panel DP that is not visually recognized by a user, and thus no stains are visually recognized even when the upper surface 520$us'$ of the second layer 520 is formed or provided to be aslant.

The pad portion PD may be disposed on an end of the peripheral area NDA of the substrate 100. The pad portion PD may include pads for contacting the terminal portion 40 and the data driving unit 50 of FIG. 5. In an embodiment, each of the pads may be a double layer including a first pad metal PM1 and a second pad metal PM2. In an embodiment, the first pad metal PM1 may include the same material as that included in the gate electrode G, and the second pad metal PM2 may include the same material as that included in the fan-out wire FW or the contact metal 130. However, the invention is not limited thereto. Although the pad portion PD is entirely exposed on the inorganic insulating layer IOL in FIG. 6, an edge of the pad portion PD may be covered by an insulating layer.

A control dam CD may be arranged on a portion of the peripheral area NDA that is outside the bending area BA. The second layer 520 may be controlled by the control dam CD. The control dam CD may be between the bending area BA and the pad portion PD so that the second layer 520 does not extend to the pad portion PD. Because the pad portion PD needs to be connected to an IC and/or a PCB, the second layer 520 may not overlap the pad portion PD.

In an embodiment, the control dam CD may be arranged on the inorganic insulating layer IOL, and may include the same material as that included in the first layer 510 of the optical functional layer OU. As described above, the second layer 520 is controlled by the control dam CD, and thus the second layer 520 may not extend over the control dam CD. The control dam CD may include a first dam CD1 and a second dam CD2 spaced apart from each other. A width of the first dam CD1 and a width of the second dam CD2 along a predetermined direction (e.g., horizontal direction in FIG. 6) may be identical to each other or different from each other.

Figure 7:
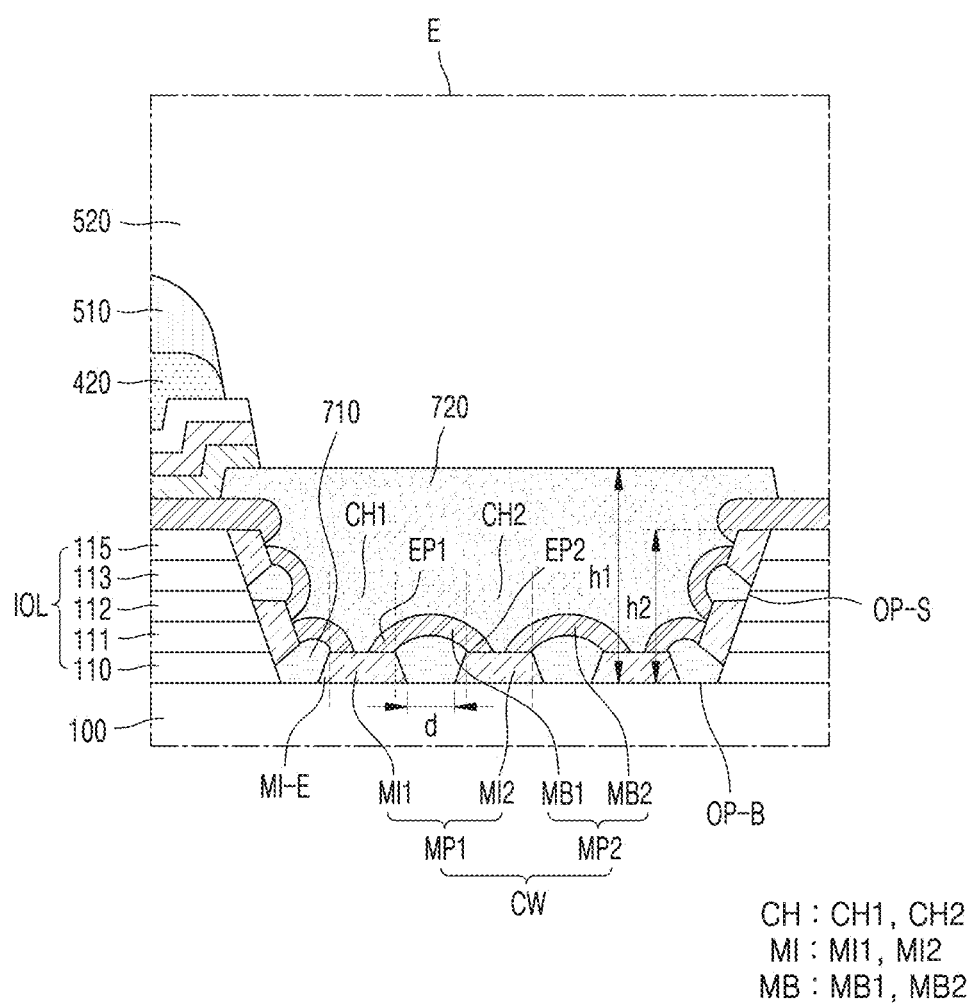
FIG. 7 is a schematic magnified cross-sectional view of a portion of FIG. 6.

FIG. 7 is a schematic magnified plan view of a portion of FIG. 6, for example, the portion E.

Referring to FIG. 7, as described above, the first metal pattern MP1 may be arranged directly on the slanting surface OP-S and the bottom surface OP-B of the opening OP. The first metal pattern MP1 may include a plurality of metal islands MI arranged in the first direction (e.g., the y direction). The plurality of metal islands MI may be spaced apart from one another at regular intervals of a distance d.

The first organic layer 710 is on the first metal pattern MP1. The first organic layer 710 may expose at least a portion of each of the metal islands MI through the contact holes CH penetrating through the first organic layer 710. In an embodiment, the first organic layer 710 may be arranged to cover an edge MI-E of each of the metal islands MI.

An upper surface of the first organic layer 710 may have a convex portion and a concave portion. In an embodiment, the first organic layer 710 may include an upper surface in the shape of a wave of which a height is smallest in the contact hole CH and increases in a direction away from the contact hole CH.

The second metal pattern MP2 may be arranged alternately with the first metal pattern MP1 in the first direction (e.g., the y direction). The second metal pattern MP2 may include a plurality of metal bridges MB spaced apart from one another. The plurality of metal bridges MB may connect metal islands MI adjacent to each other in the first direction (e.g., the y direction).

In an embodiment, a first metal island MI1 and a second metal island MI2 adjacent to each other may be connected to each other by a first metal bridge MB1. One end EP1 of the first metal bridge MB1 may contact an exposed surface of the first metal island MI1, and another end EP2 thereof may contact an exposed surface of the second metal island MI2.

The second metal pattern MP2 may be arranged on the first organic layer 710 and may have a shape corresponding to the upper surface of the first organic layer 710. In an embodiment, when the first organic layer 710 has an upper surface in a wave shape, the second metal pattern MP2 may have a wave shape corresponding to the upper surface of the first organic layer 710, and thus may have increased flexibility.

The buried organic layer 720 may be arranged on the connection wire CW in correspondence with the opening OP and may fill at least a portion of the opening OP. In an embodiment, a first height h1 from the bottom surface OP-B of the opening OP to the upper surface of the buried organic layer 720 may be greater than a second height h2 from the bottom surface OP-B of the opening OP to the upper surface of the inorganic insulating layer IOL. Due to this adjustment of the thickness and the modulus of the buried organic layer 720, the neutral plane of the bending area BA may be controlled to be disposed near the connection wire CW.

The second layer 520 of the optical functional layer OU may be arranged directly on the buried organic layer 720. The second layer 520 may extend to the peripheral area NDA to cover the bending area BA, and thus may prevent visual recognition of stains in a boundary between the display area DA and the peripheral area NDA. Due to the arrangement of the second layer 520 on the bending area BA, the location of the neutral plane of the bending area BA may be controlled to reduce the stress that is applied to the connection wire CW.

FIGS. 8A through 8E are schematic magnified cross-sectional views of an embodiment of a portion of a display apparatus. FIGS. 8A through 8E illustrate magnified areas starting from a line C-C' of FIG. 6 and including the pad portion PD, and some of FIGS. 8A through 8E correspond to modifications.

Figure 8A:
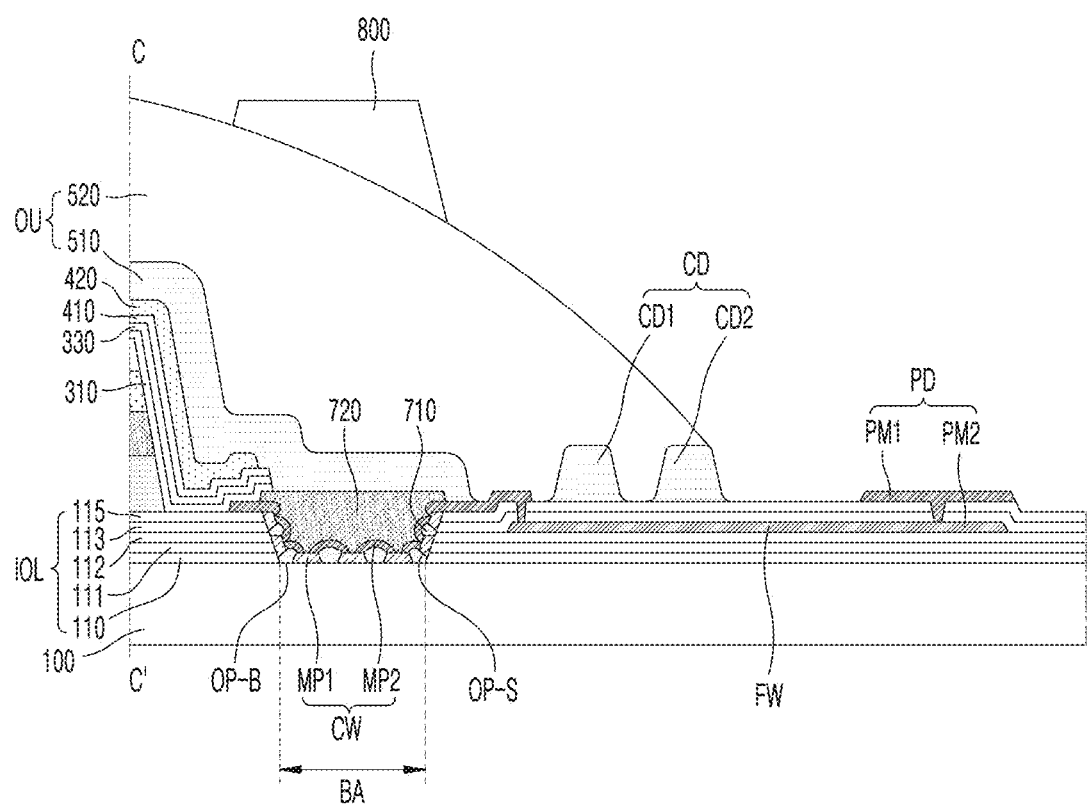
FIGS. 8A through 8E are schematic magnified cross-sectional views of an embodiment of a portion of a display apparatus.

Referring to FIG. 8A, the first organic layer 710 may include the same material as that included in the first planarization insulating layer 116 of FIG. 6, and the buried organic layer 720 may include the same material as that included in the second planarization insulating layer 117 of FIG. 6.

When an inorganic layer exists in an upper portion of the bending area BA, cracks may be caused, and thus respective ends of the first inorganic encapsulation layer 310, the second inorganic encapsulation layer 330, and the first insulating layer 410 may not extend over the bending area BA. In an embodiment, the first inorganic encapsulation layer 310, the second inorganic encapsulation layer 330, and the first insulating layer 410 may be arranged to cover a portion of the upper surface of the buried organic layer 720, but does not extend to the upper surface of the buried organic layer 720 corresponding to the bending area BA.

The first layer 510 of the optical functional layer OU may be arranged to extend over a portion of the peripheral area NDA beyond the bending area BA. In other words, the first layer 510 may be arranged to cover the buried organic layer 720. In this case, an end of the second insulating layer 420 of the touch sensing layer TU may not extend over the respective ends of the first inorganic encapsulation layer 310, the second inorganic encapsulation layer 330, and the first insulating layer 410. Accordingly, the first layer 510 may be arranged directly on the buried organic layer 720, and the second layer 520 may be disposed on the first layer 510.

Figure 8B:
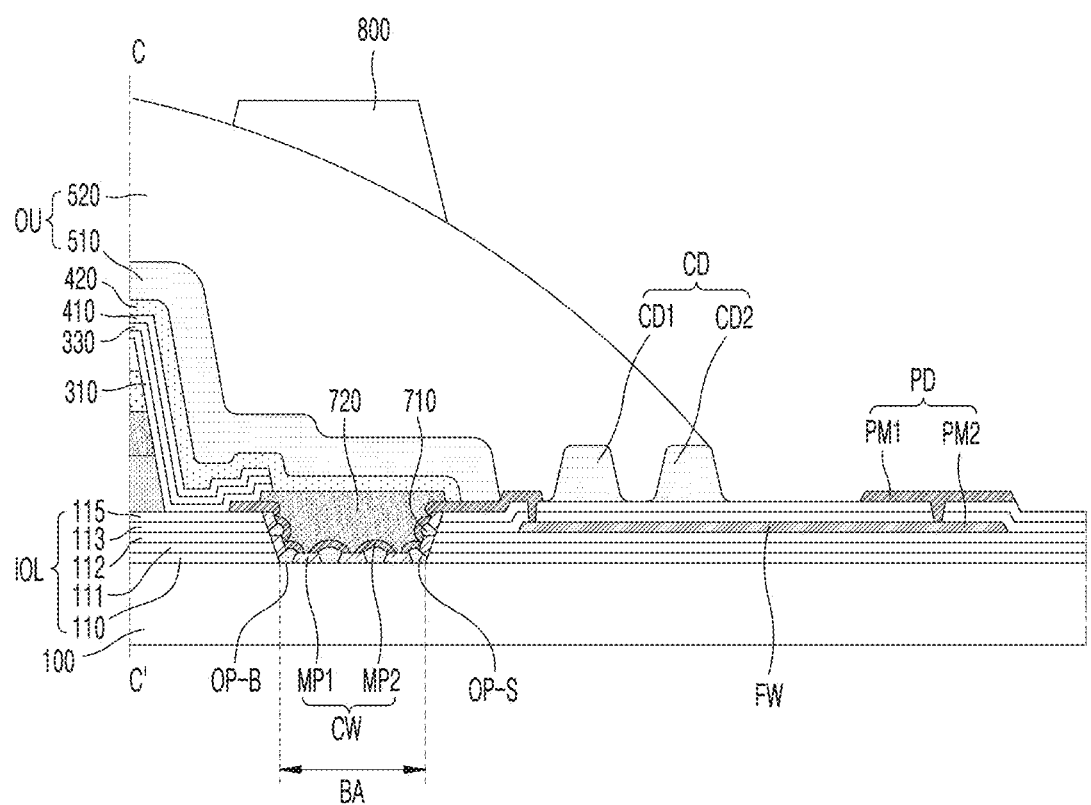

Referring to FIG. 8B, when the second insulating layer 420 includes an organic insulating material, the second insulating layer 420 may be arranged to extend over a portion of the peripheral area NDA beyond the bending area BA. In other words, the second insulating layer 420 may be arranged directly on the buried organic layer 720 to cover the buried organic layer 720. The first layer 510 may be arranged on the second insulating layer 420, and the second layer 520 may be disposed on the first layer 510.

Figure 8C:
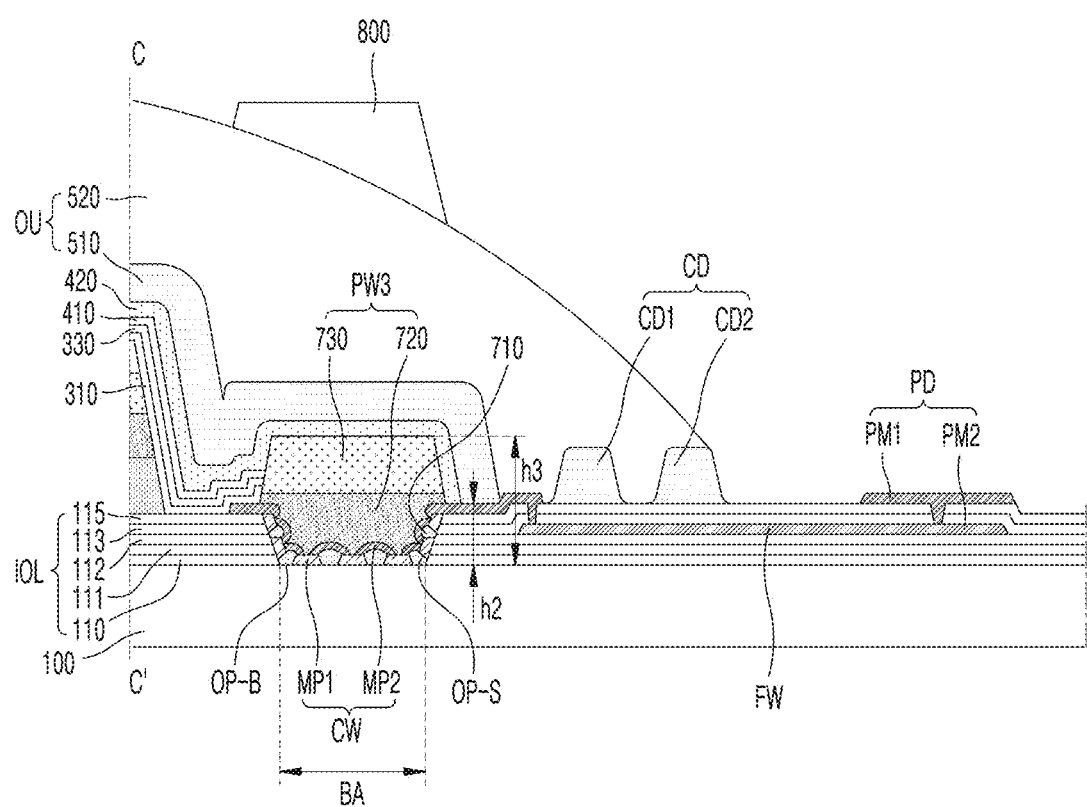

Referring to FIG. 8C, a second organic layer 730 may be disposed on the buried organic layer 720. The second organic layer 730 may include the same material as that included in the pixel defining layer 119 of FIG. 6. When the second organic layer 730 includes the same material as that included in the pixel defining layer 119 of FIG. 6, the second organic layer 730 and the pixel defining layer 119 of FIG. 6 may be formed or provided simultaneously.

A third height h3 from the bottom surface OP-B of the opening OP to the upper surface of the second organic layer 730 may be greater than the second height h2 from the bottom surface OP-B of the opening OP to the upper surface of the inorganic insulating layer IOL. By adjusting the thickness and modulus of each of the buried organic layer 720 and the second organic layer 730, the location of the neutral plane of the bending area BA may be easily controlled. The buried organic layer 720 and the second organic layer 730 may constitute a third partition wall PW3.

The first inorganic encapsulation layer 310 and the second inorganic encapsulation layer 330 of the thin-film encapsulation layer TFE and the end of the first insulating layer 410 of the touch sensing layer TU may each extend to the third partition wall PW3. In an embodiment, respective ends of the first inorganic encapsulation layer 310, the second inorganic encapsulation layer 330, and the first insulating layer 410 may be arranged over the third partition wall PW3 or may be disposed on the third partition wall PW3.

In an embodiment, the first layer 510 of the optical functional layer OU may be arranged to extend over a portion of the peripheral area NDA beyond the third partition wall PW3. In another embodiment, the second insulating layer 420 of the touch sensing layer TU may be arranged to extend over a portion of the peripheral area NDA beyond the third partition wall PW3. In another embodiment, the second insulating layer 420 and the first layer 510 may be arranged to extend over a portion of the peripheral area NDA beyond the third partition wall PW3. In another embodiment, the second insulating layer 420 and the first layer 510 may not extend over the bending area BA and thus may not cover the third partition wall PW3.

Figure 8D:
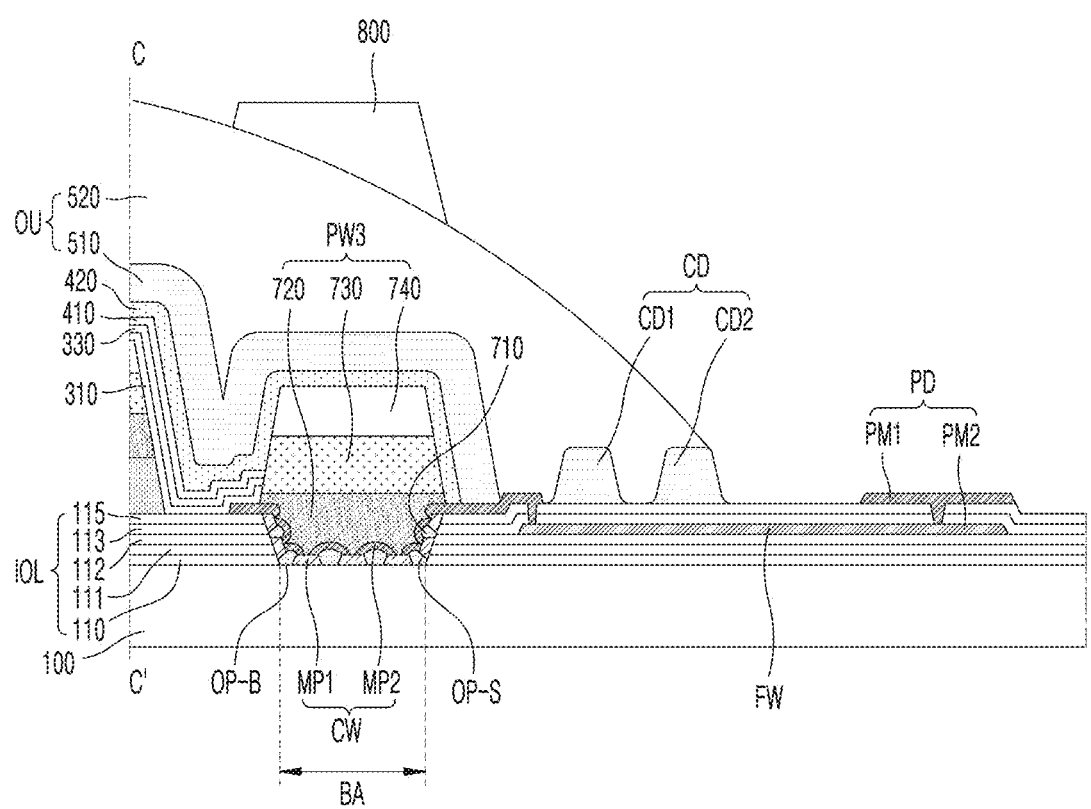

Referring to FIG. 8D, a plurality of organic layers may be further arranged on the third partition wall PW3. In an embodiment, a third organic layer 740 may be further arranged on the second organic layer 730, for example. The third organic layer 740 may include, but is not limited to, the same material as that included in the spacer 121.

When the second insulating layer 420 includes an organic insulating material, the second insulating layer 420 may be arranged to extend over a portion of the peripheral area NDA beyond the bending area BA. In other words, the second insulating layer 420 may be arranged to cover the third organic layer 740. The first layer 510 may be arranged on the second insulating layer 420, and the second layer 520 may be disposed on the first layer 510.

Accordingly, the buried organic layer 720, the second organic layer 730, the third organic layer 740, the first layer 510, or the second layer 520 that may be arranged on the bending area BA may be simultaneously formed or provided during formation of a stack structure of the display area DA, without a special additional formation process.

Figure 8E:
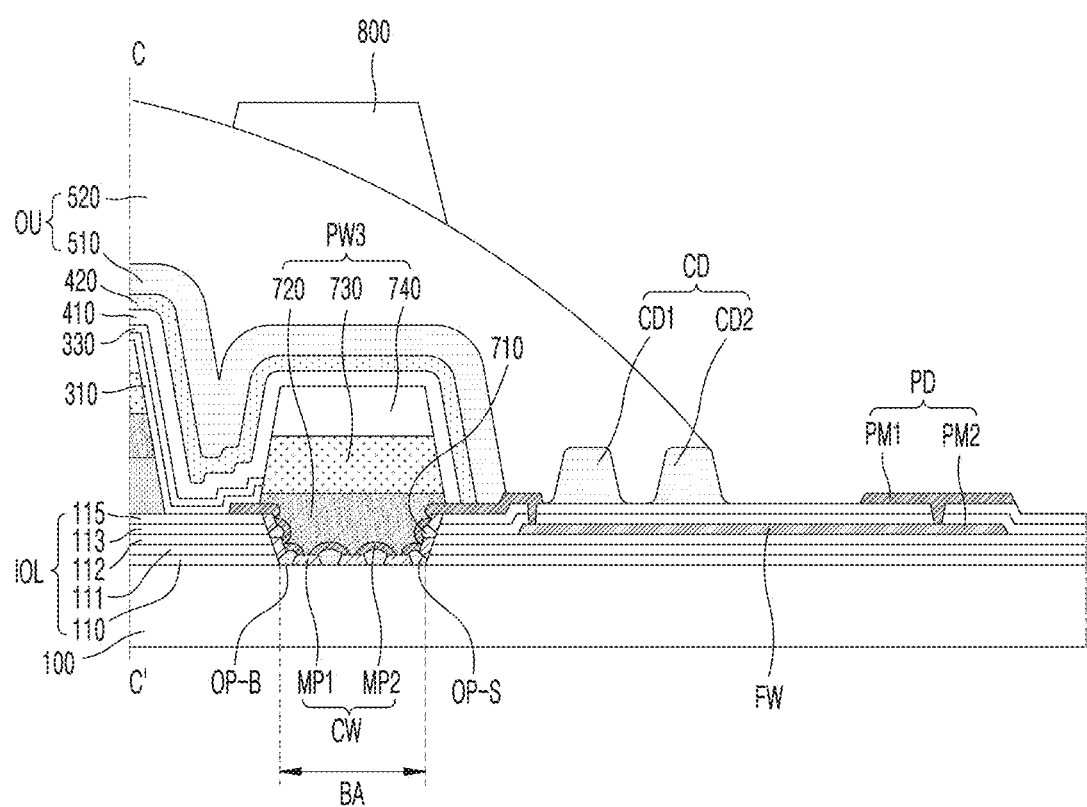

Referring to FIG. 8E, the first insulating layer 410 and the second insulating layer 420 may include an organic insulating material. When the first insulating layer 410 and the second insulating layer 420 include an organic insulating material, the first insulating layer 410 may be arranged to extend over a portion of the peripheral area NDA beyond the bending area BA. The second insulating layer 420 may be arranged on the first insulating layer 410. The first layer 510 may be arranged on the second insulating layer 420.

Although the buried organic layer 720, the second organic layer 730, and the third organic layer 740 are stacked in the bending area BA in FIG. 8E, the above-described structure of the first insulating layer 410, the second insulating layer 420, the first layer 510, and the second layer 520 is equally applicable even when only the buried organic layer 720 is arranged in the bending area BA or when the buried organic layer 720 and the second organic layer 730 are stacked in the bending area BA.

As shown in FIGS. 8A through 8E, the stress reduction layer 800 may be disposed on the second layer 520 in correspondence with the bending area BA. Thicknesses, moduli, or the like of the layers arranged on the bending area BA from among the buried organic layer 720, the second organic layer 730, the third organic layer 740, the second insulating layer 420, the first layer 510, the second layer 520, and the stress reduction layer 800 are adjusted, and thus a location of a stress neutral plane within a stack including all of the substrate 100 and the connection wire CW in the bending area BA may be controlled. Because the stress neutral plane is disposed near the connection wire CW in the bending area BA due to a combination of these layers, a stress applied to the connection wire CW in the bending area BA may be effectively reduced.

In an embodiment, the stress reduction layer 800 may include an organic insulating material, and may include, for example, an organic material (such as, polyimide, epoxy resin, acrylic resin, polyester, photoresist, polyacrylic resin, polyimide-based resin, polyamide-based resin, or siloic acid resin), and an elastic material including silicon, urethane, thermoplastic polyurethane, or the like. A width of the stress reduction layer 800 may be equal to or greater than a width of the bending area BA. In an embodiment, the width of the stress reduction layer 800 may be about 40 mm to about 60 mm. In an embodiment, a thickness of the stress reduction layer 800 may be about 100 micrometers (μm) to about 140 μm, for example, but may vary according to the location of the stress neutral plane of the stack on the bending area BA.

Figure 9:
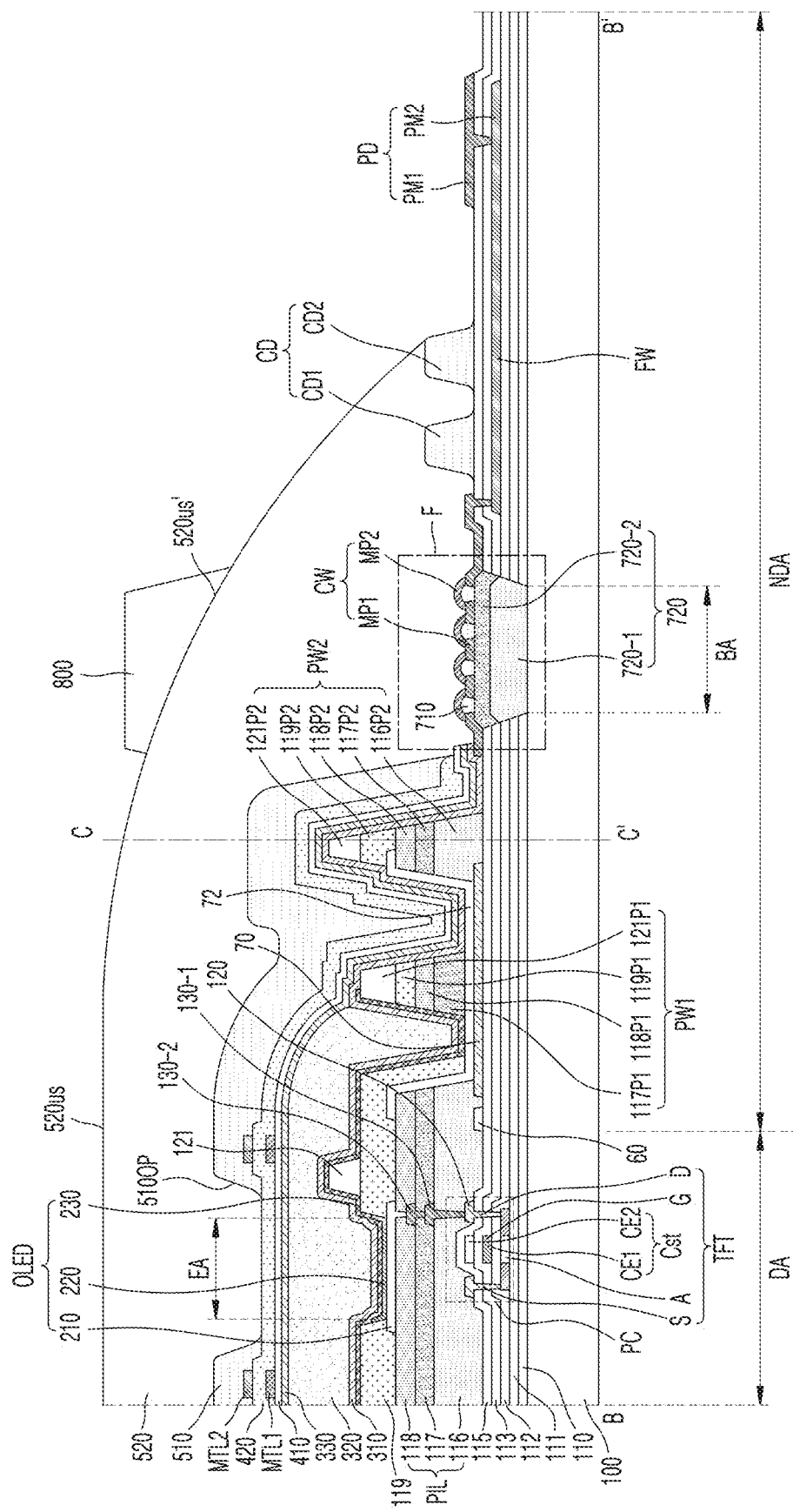
FIG. 9 is a schematic cross-sectional view of an embodiment of a portion of a display apparatus.

FIG. 9 is a schematic cross-sectional view of a portion of a display apparatus.

FIG. 9 is similar to FIG. 6, but may further include a third planarization insulating layer 118. FIG. 9 is different from FIG. 6 in terms of a relationship between the first organic layer 710, the buried organic layer 720, and the connection wire CW in the bending area BA. The other components are the same as those of the display apparatus of FIG. 6, and thus differences between FIGS. 6 and 9 will now be focused on and described.

Referring to FIG. 9, in the display area DA, the third planarization insulating layer 118 is on the second planarization insulating layer 117. A first contact metal 130-1 may be arranged on the second planarization insulating layer 117, and a second contact metal 130-2 may be arranged on the third planarization insulating layer 118. The electrode layer 120 and the pixel electrode 210 may be electrically connected to each other via the first contact metal 130-1 and the second contact metal 130-2.

The buried organic layer 720 may be arranged under the connection wire CW in correspondence with the opening OP. The buried organic layer 720 may fill at least a portion of the opening OP. In an embodiment, an upper surface of the buried organic layer 720 may be arranged to be higher than an upper surface of the inorganic insulating layer IOL, and thus locations of the neutral plane of the bending area BA and the connection wire CW may be controlled.

The buried organic layer 720 may include the same material as that included in the planarization insulating layer PIL. In an embodiment, the buried organic layer 720 may be a single layer. In this case, the buried organic layer 720 may include the same material as that included in the first planarization insulating layer 116, the second planarization insulating layer 117, or the third planarization insulating layer 118.

In another embodiment, the buried organic layer 720 may include a plurality of layers. As shown in FIG. 9, the buried organic layer 720 may include a first filling layer 720-1, and a second filling layer 720-2 arranged on the first filling layer 720-1.

The first filling layer 720-1 may include the same material as that included in the first planarization insulating layer 116. In this case, the second filling layer 720-2 may include the same material as that included in the second planarization insulating layer 117 or the third planarization insulating layer 118. In an embodiment, the first filling layer 720-1 may include the same material as that included in the second planarization insulating layer 117, and the second filling layer 720-2 may include the same material as that included in the third planarization insulating layer 118.

In an embodiment, an upper surface of the second filling layer 720-2 may be arranged to be higher than the upper surface of the inorganic insulating layer IOL, and thus locations of the neutral plane of the bending area BA and the connection wire CW may be controlled.

The first metal pattern MP1 of the connection wire CW may be disposed on the buried organic layer 720. As shown in FIG. 9, when the second filling layer 720-2 is further included, the first metal pattern MP1 may be disposed on the second filling layer 720-2.

In an embodiment, the first metal pattern MP1 may include the same material as that included in the first contact metal 130-1. When the first metal pattern MP1 includes the same material as that included in the first contact metal 130-1, the first metal pattern MP1 and the first contact metal 130-1 may be formed or provided simultaneously. In another embodiment, the first metal pattern MP1 may include the same material as that included in the second contact metal 130-2. When the first metal pattern MP1 includes the same material as that included in the second contact metal 130-2, the first metal pattern MP1 and the second contact metal 130-2 may be formed or provided simultaneously.

The first organic layer 710 is formed or disposed on the first metal pattern MP1. The first organic layer 710 may expose at least respective portions of first metal patterns MP1 via contact holes CH of FIG. 10. The first organic layer 710 may include the same material as that included in the pixel defining layer 119. When the first organic layer 710 includes the same material as that included in the pixel defining layer 119, the first organic layer 710 and the pixel defining layer 119 may be formed or provided simultaneously.

The second metal pattern MP2 may be disposed on the first organic layer 710. The second metal pattern MP2 may be electrically connected to the first metal pattern MP1 through the contact holes CH of FIG. 10 that penetrate through the first organic layer 710. The second metal pattern MP2 may include the same material as that included in the first conductive layer MTL1 of the touch sensing layer TU. When the second metal pattern MP2 includes the same material as that included in the first conductive layer MTL1, the second metal pattern MP2 may be formed or provided simultaneously with the first conductive layer MTL1.

In an embodiment, the first partition wall PW1 may include a portion 117P1 of the second planarization insulating layer 117, a portion 118P1 of the third planarization insulating layer 118, a portion 119P1 of the pixel defining layer 119, and a portion 121P1 of the spacer 121, and the second partition wall PW2 may include a portion 116P2 of the first planarization insulating layer 116, a portion 117P2 of the second planarization insulating layer 117, a portion 118P2 of the third planarization insulating layer 118, a portion 119P2 of the pixel defining layer 119, and a portion 121P2 of the spacer 121.

Figure 10:
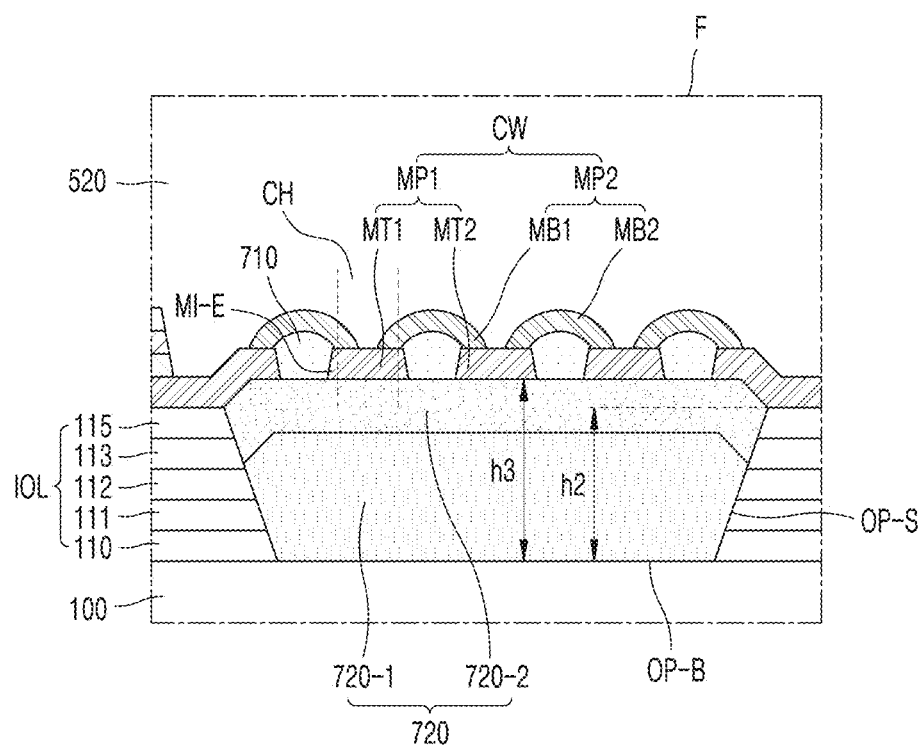
FIG. 10 is a schematic magnified cross-sectional view of a portion of FIG. 9.

FIG. 10 is a schematic magnified plan view of a portion of FIG. 9, for example, a portion F.

Referring to FIG. 10, as described above, the first metal pattern MP1 may be disposed on the second filling layer 720-2. In another embodiment, when the second filling layer 720-2 is not included, the first metal pattern MP1 may be disposed on the first filling layer 720-1.

The first metal pattern MP1 may include a plurality of metal islands MI arranged in the first direction (e.g., the y direction).

The first organic layer 710 is on the first metal pattern MP1. The first organic layer 710 may cover edges MI-E of the metal islands MI and may contact the second filling layer 720-2. An upper surface of the first organic layer 710 may have a convex portion and a concave portion. In an embodiment, the first organic layer 710 may include an upper surface in the shape of a wave of which a height is smallest in the contact holes CH and increases in a direction away from the contact holes CH.

The second metal pattern MP2 may be arranged alternately with the first metal pattern MP1 in the first direction (e.g., the y direction). The second metal pattern MP2 may include a plurality of metal bridges MB spaced apart from one another. The plurality of metal bridges MB may connect metal islands MI adjacent to each other in the first direction (e.g., the y direction).

The second metal pattern MP2 may be arranged on the first organic layer 710 and may have a shape corresponding to the upper surface of the first organic layer 710. In an embodiment, when the first organic layer 710 has an upper surface in a wave shape, the second metal pattern MP2 may have a wave shape corresponding to the upper surface of the first organic layer 710, and thus may have increased flexibility.

In an embodiment, the second layer 520 of the optical functional layer OU may be arranged directly on the second metal pattern MP2. The second layer 520 may extend to the peripheral area NDA to cover the bending area BA, and thus may prevent visual recognition of stains in a boundary between the display area DA and the peripheral area NDA. The arrangement of the second layer 520 on the bending area BA may reduce the stress that is applied to the connection wire CW.

Figure 11:
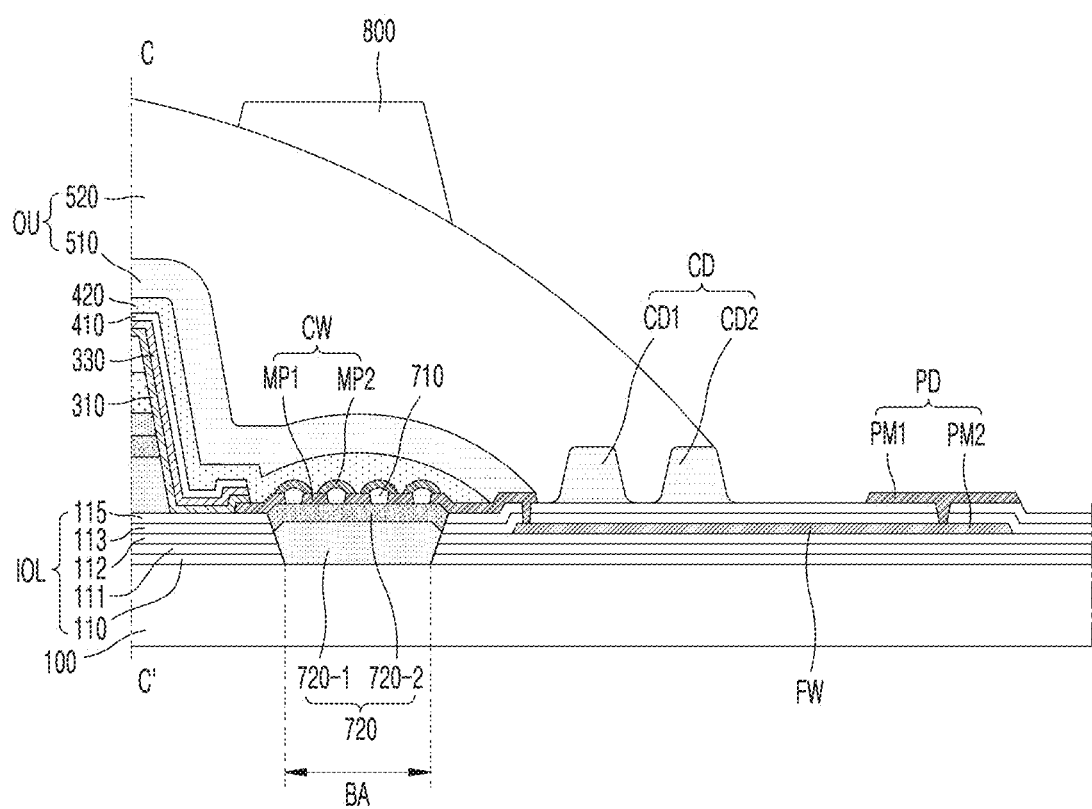
FIG. 11 is a schematic magnified cross-sectional view of an embodiment of a portion of a display apparatus.

FIG. 11 is a schematic cross-sectional view of a portion of a display apparatus. FIG. 11 illustrates a magnified area starting from a line C-C' of FIG. 9 and including the pad portion PD.

Referring to FIG. 11, the second insulating layer 420 of the touch sensing layer TU (refer to FIG. 6) and the first layer 510 of the optical functional layer OU may be arranged to extend over a portion of the peripheral area NDA beyond the bending area BA. When the second insulating layer 420 includes an organic insulating material, the second insulating layer 420 and the first layer 510 may be arranged to cover the connection wire CW and the first organic layer 710. In another embodiment, when the first insulating layer 410 and the second insulating layer 420 include an organic insulating material, the first insulating layer 410, the second insulating layer 420, and the first layer 510 may be arranged to cover the connection wire CW and the first organic layer 710. In another embodiment, an end of the second insulating layer 420 may not extend over respective ends of the first inorganic encapsulation layer 310, the second inorganic encapsulation layer 330, and the first insulating layer 410, and the first layer 510 may extend over a portion of the peripheral area NDA beyond the bending area BA. The second layer 520 may be disposed on the first layer 510.

As shown in FIGS. 10 and 11, the stress reduction layer 800 may be further on the second layer 520 in correspondence with the bending area BA.

Thicknesses, moduli, or the like of the layers arranged on the bending area BA from among the first filling layer 720-1, the second filling layer 720-2, the first layer 510, the second layer 520, and the stress reduction layer 800 are adjusted, and thus a location of a stress neutral plane within a stack including all of the substrate 100 and the connection wire CW in the bending area BA may be controlled.

Figure 12A:
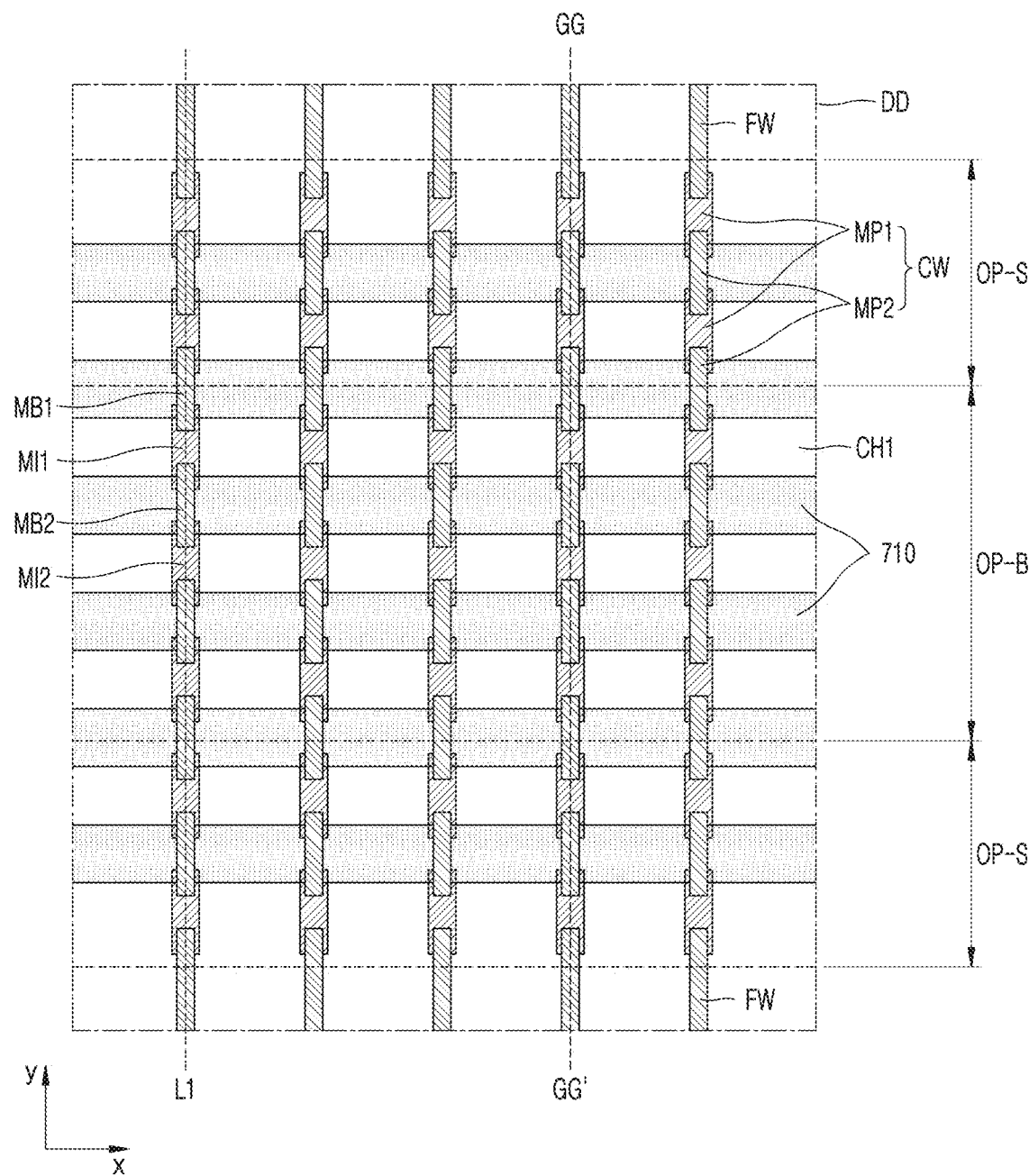
FIGS. 12A through 12D are schematic magnified plan views of a region of FIG. 5.
Figure 12B:
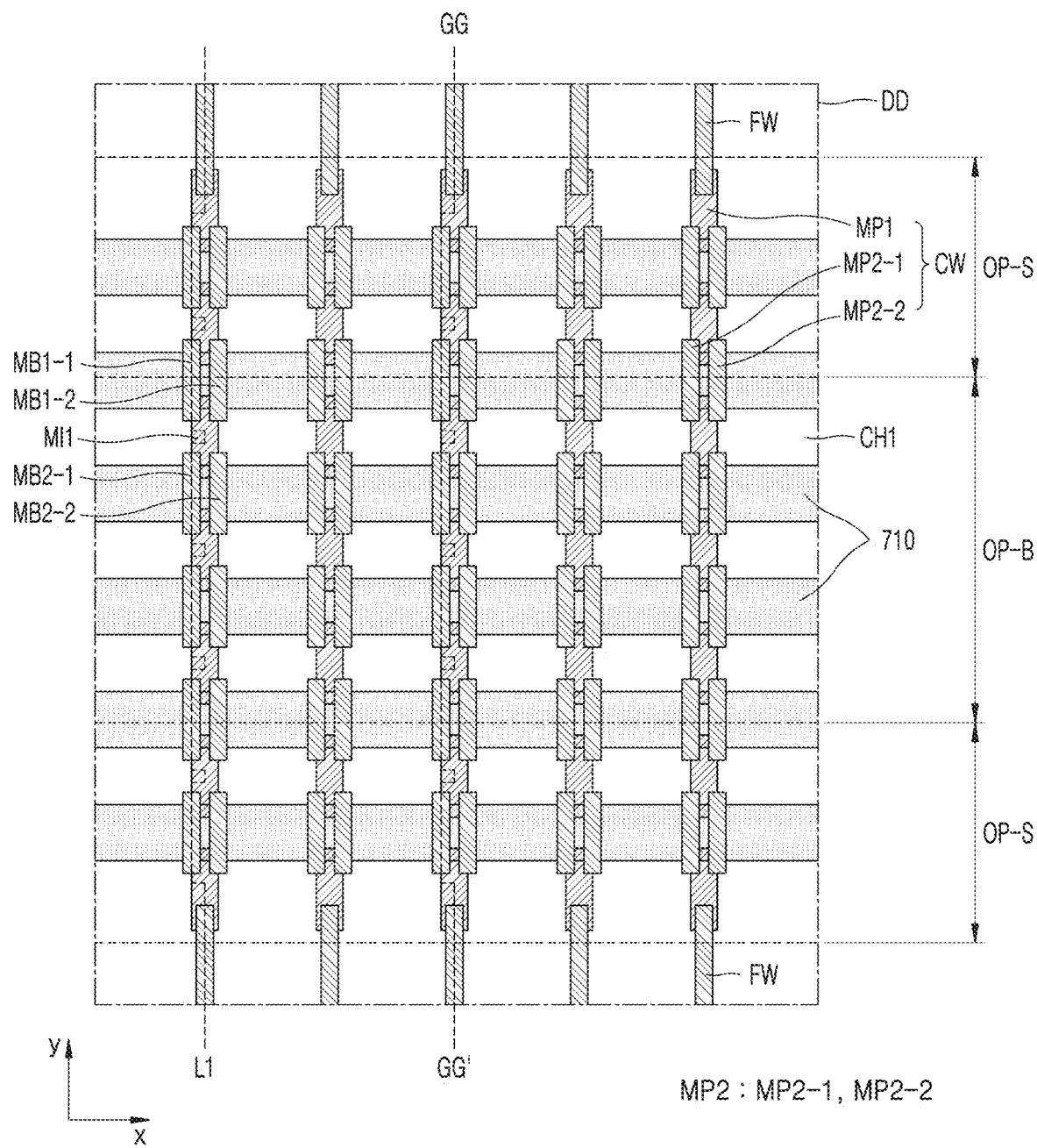
Figure 12C:
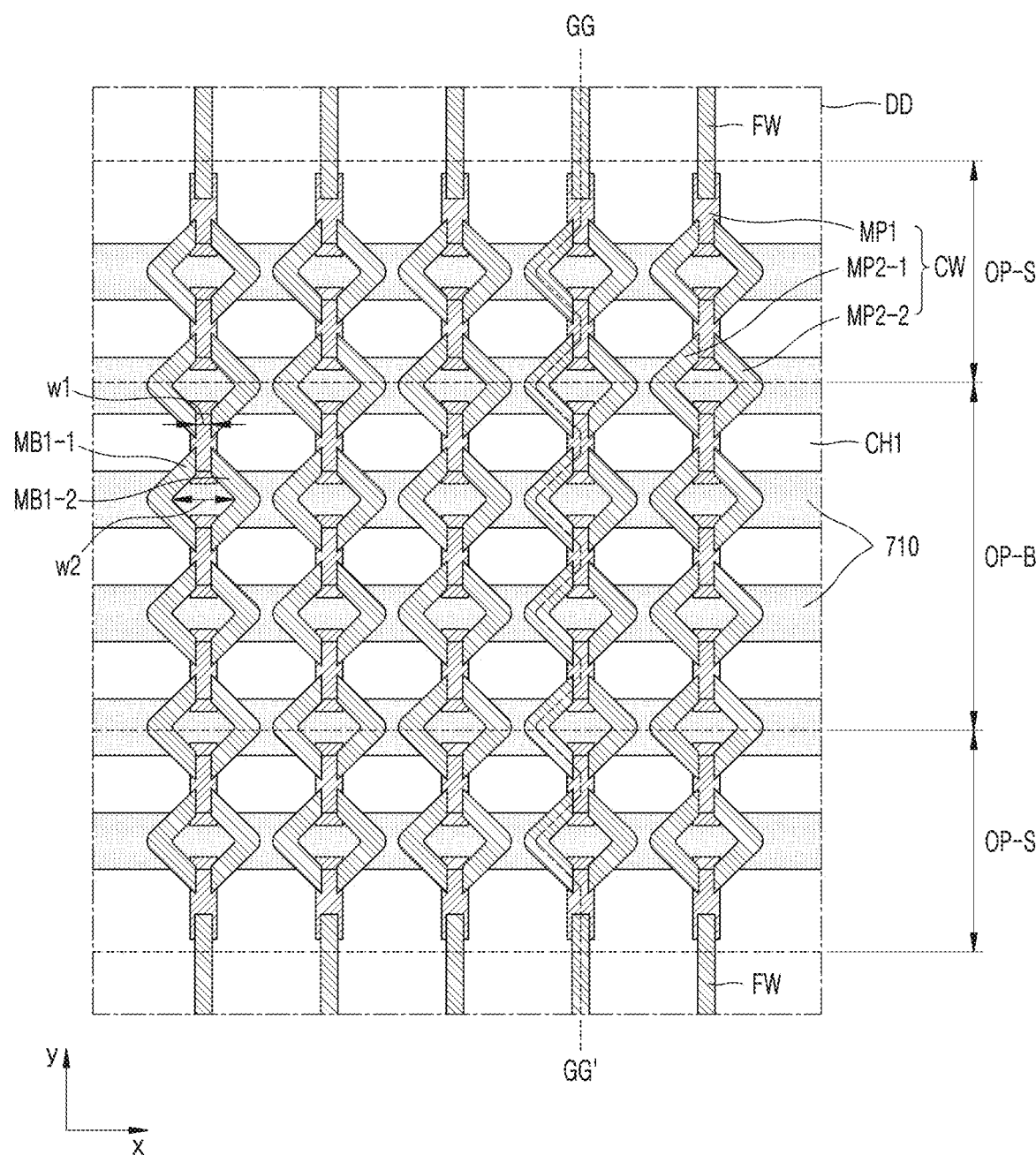
Figure 12D:
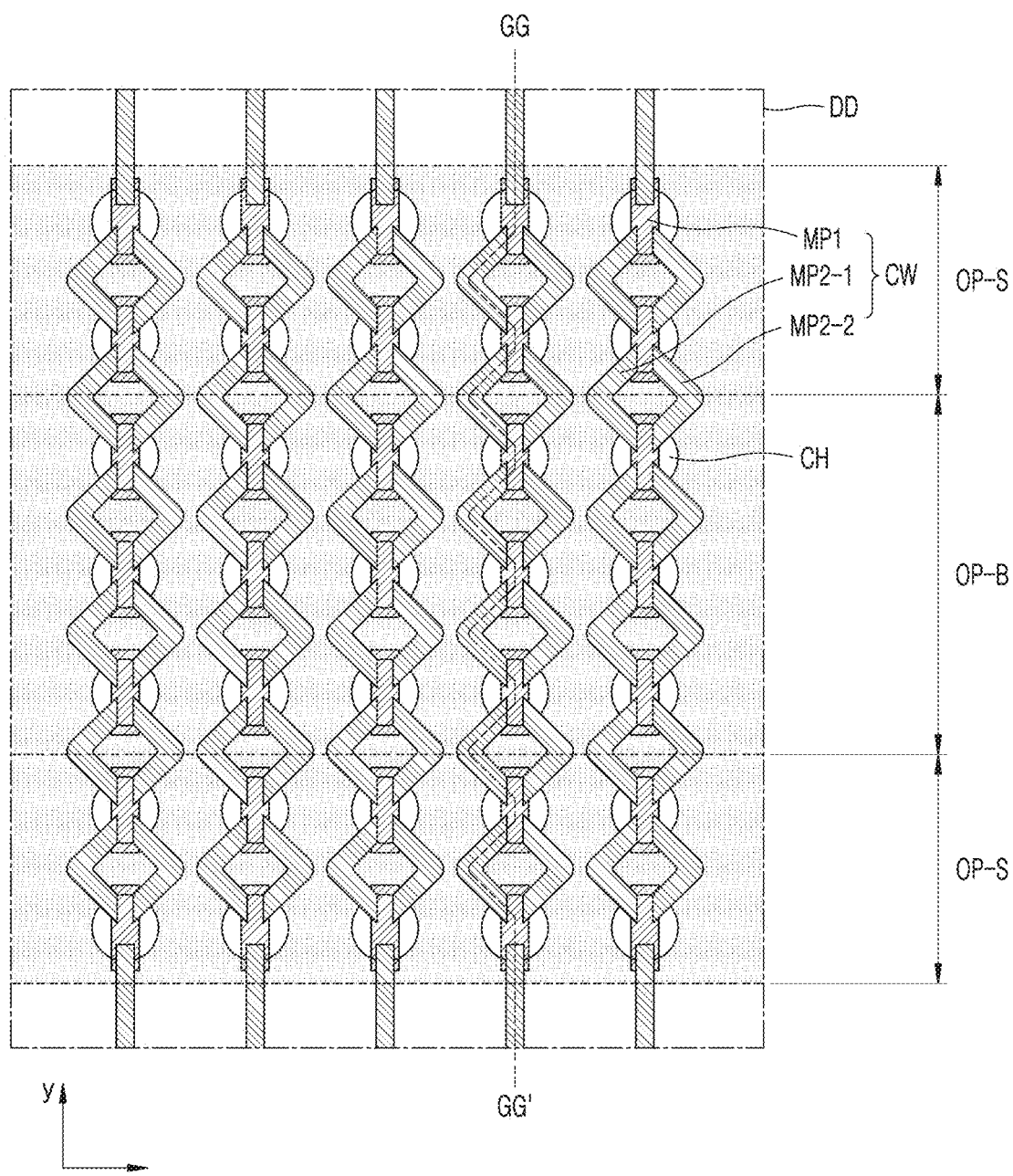
Figure 13:
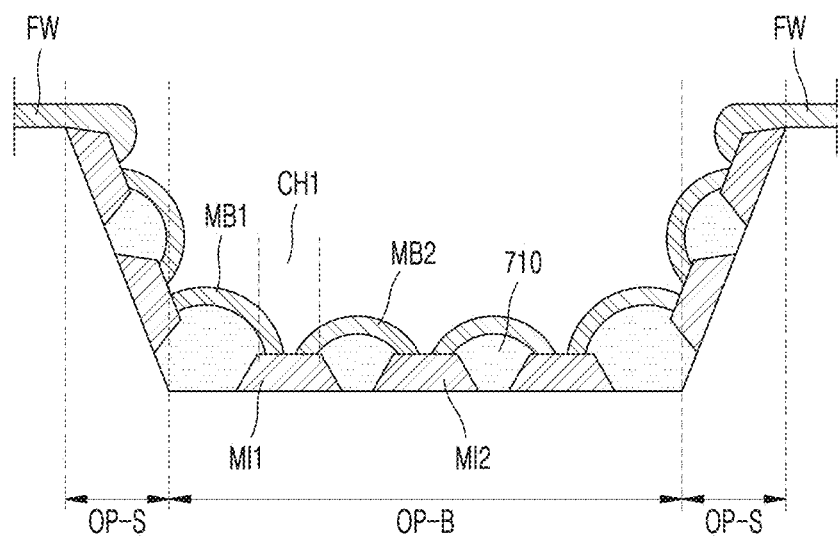
FIG. 13 is a schematic cross-sectional view of display panel taken along line GG-GG' of a connection wire of FIGS. 12A through 12D.

FIGS. 12A through 12D are schematic magnified plan views of a portion of FIG. 5, for example, a portion DD, and FIG. 13 is a cross-sectional view of the portion DD taken along line GG-GG' of FIGS. 12A through 12D.

Referring to FIGS. 12A and 13, the opening OP corresponding to the bending area BA is defined in the inorganic insulating layer IOL. The opening OP has the slanting surface OP-S and the bottom surface OP-B. The connection wire CW is arranged on the opening OP in the first direction (e.g., they direction).

The first metal pattern MP1 of the connection wire CW is on the opening OP. In an embodiment, the first metal pattern MP1 may be directly on the slanting surface OP-S and the bottom surface OP-B of the opening OP. In another embodiment, the first metal pattern MP1 may be disposed on an organic layer that fills at least a portion of the opening OP.

The first metal pattern MP1 may include a plurality of metal islands MI spaced apart from one another in the first direction (e.g., the y direction). The plurality of metal island MI arranged in the first direction (e.g., the y direction) may constitute a discontinuous line L1, and discontinuous lines L1 may be spaced apart from one another in the second direction (e.g., the x direction).

The first organic layer 710 may expose at least a portion of each of the first metal patterns MP1, and may be arranged on the first metal patterns MP1. A contact hole CH that penetrates through the first organic layer 710 and exposes at least a portion of each of the first metal patterns MP1 may be defined in the first organic layer 710. The first organic layer 710 may be arranged to cover an edge of each of the first metal patterns MP1.

The first organic layer 710 may include a convex portion and a concave portion. In an embodiment, the first organic layer 710 may include an upper surface in the shape of a wave of which a height is smallest in the contact holes CH and increases in a direction away from the contact holes CH.

The second metal pattern MP2 may be arranged on the first organic layer 710 in the first direction (e.g., the y direction). The second metal pattern MP2 may have a shape corresponding to the upper surface of the first organic layer 710. In an embodiment, when the first organic layer 710 has an upper surface in a wave shape, the second metal pattern MP2 may have a wave shape corresponding to the upper surface of the first organic layer 710, and thus may have increased flexibility. The second metal pattern MP2 may be arranged alternately with the first metal pattern MP1 in the first direction (e.g., the y direction).

The second metal pattern MP2 may include a plurality of metal bridges MB spaced apart from one another. The plurality of metal bridges MB may connect metal islands MI adjacent to each other in the first direction (e.g., the y direction). In an embodiment, an end of the first metal bridge MB1 may be connected to the first metal island MI1, and the other end thereof may be connected to the second metal island MI2 adjacent to the first metal island MI1. The two first and second metal bridges MB1 and MB2 meeting in the contact hole CH1 exposing the first metal island MI1 may be spaced apart from each other. In another embodiment, respective ends of the two first and second metal bridges MB1 and MB2 meeting in a contact hole CH1 exposing the first metal island MI1 may be adjacent to each other.

As such, because the connection wire CW includes the first metal pattern MP1 and the second metal pattern MP2 connecting first metal patterns MP1 to each other, the stress that is applied to the connection wire CW may be reduced and thus cracks of the connection wire CW may be prevented, while the substrate 100 is being bent.

As a comparative example, when a connection wire is a consecutive single metal layer, cracks may be generated in one point of the connection wire due to a stress that is applied to the entire connection wire, while a substrate is being bent.

Referring to FIG. 12B, the second metal pattern MP2 includes first bridges MP2-1 and second bridges MP2-2 spaced apart from each other with the metal islands MI therebetween. In an embodiment, the first bridges MP2-1 and the second bridges MP2-2 may be spaced apart from a discontinuous line L1 constituted by the metal islands MI, in parallel to the discontinuous line L1. In a contact hole CH1 that exposes one metal island MI1, two bridges MB1-1 and MB2-1 constituting the first bridges MP2-1 and two bridges MB1-2 and MB2-2 constituting the second bridges MP2-2 may meet the metal island MI1 at a plurality of points.

The second metal pattern MP2 may have at least two electrical paths by multi-contacting the first metal pattern MP1. Thus, even when cracks or short-circuits are generated in the metal bridges MB constituting the second metal pattern MP2, another electrical path may be maintained.

Referring to FIG. 12C, a separation distance between the first bridges MP2-1 and the second bridges MP2-2 may vary according to locations of the first bridges MP2-1 and the second bridges MP2-2. In an embodiment, a separation distance w1 between a first metal bridge MB1-1 and a second the metal bridge MB1-2 in the contact hole CH1 may be less than a separation distance w2 between a first metal bridge MB1-1 and a second the metal bridge MB1-2 on the first organic layer 710. As the metal bridges MB constituting the second metal pattern MP2 has a bent shape, a tensile force of the connection wire CW may be further improved.

FIG. 12D is different from FIG. 12C in terms of the shape of a contact hole CH of the first organic layer 710.

Referring to FIG. 12D, contact holes CH exposing respective centers of the first metal patterns MP1 may be defined in the first organic layer 710. Each contact hole CH may have a circle shape as shown in FIG. 12D or may have any shape such as a quadrangular (e.g., rectangular) shape or a diamond shape. The first organic layer 710 may include a convex portion and a concave portion. In an embodiment, the first organic layer 710 may include an upper surface in the shape of a wave of which a height is smallest in the contact holes CH and increases in a direction away from the contact holes CH. As described above, the first organic layer 710 may be arranged to cover an edge of each of the first metal patterns MP1.

The structure of the first organic layer 710 in the illustrated embodiment is equally applicable to all of the embodiments described above with reference to FIGS. 10A through 10C.

In an embodiment as described above, a display apparatus having reduced cracks in a bending area may be realized. Of course, the scope of the invention is not limited thereto.

It should be understood that embodiments described herein should be considered in a descriptive sense only and not for purposes of limitation. Descriptions of features or advantages within each embodiment should typically be considered as available for other similar features or advantages in other embodiments. While embodiments have been described with reference to the drawing figures, it will be understood by those of ordinary skill in the art that various changes in form and details may be made therein without departing from the spirit and scope as defined by the following claims.

What is claimed is:

1. An electronic apparatus comprising:
a display apparatus comprising:
a substrate including a display area, a peripheral area surrounding the display area and extending to one side, and a bending area which is at least a portion of the peripheral area which is bendable;
an inorganic insulating layer arranged on the substrate and overlapping the display area and the peripheral area and defining an opening corresponding to the bending area;
a pixel circuit in the display area;
a display element on the pixel circuit and comprising a pixel electrode, an intermediate layer on the pixel electrode, and an opposite electrode on the intermediate layer;
a contact metal electrically connecting the pixel circuit to the display element;
an optical functional layer entirely over the opposite electrode and comprising a first layer defining an opening pattern corresponding to the display element and a second layer arranged directly on the first layer and extending to the peripheral area and covering the bending area;
a pad portion on an end of the peripheral area;
a first organic layer in the bending area; and
a connection wire extending on the pad portion beyond the display area and the bending area, and at least partially including a same material as a material of the contact metal, the connection wire comprising:
first metal patterns under the first organic layer; and
second metal patterns on the first organic layer and electrically connected to the first metal patterns via contact holes which penetrate through the first organic layer.

2. The electronic apparatus of claim 1, wherein the opening includes a first surface which is slanted and a second surface facing the substrate, and
at least a portion of the connection wire contacts the first surface and the second surface.

3. The electronic apparatus of claim 1, further comprising a planarization insulating layer on the pixel circuit,
wherein the planarization insulating layer comprises:
a first planarization insulating layer; and
a second planarization insulating layer on the first planarization insulating layer, and
the first organic layer comprises a same material as a material included in the first planarization insulating layer.

4. The electronic apparatus of claim 3, further comprising a buried organic layer arranged on the connection wire in correspondence with the opening and filling at least a portion of the opening.

5. The electronic apparatus of claim 4, wherein a first height from a surface of the opening facing the substrate to a surface of the buried organic layer opposite to the surface of the opening is greater than a second height from the surface of the opening to a surface of the inorganic insulating layer opposite to the surface of the opening.

6. The electronic apparatus of claim 4, wherein the buried organic layer comprises a same material as a material included in the second planarization insulating layer.

7. The electronic apparatus of claim 4, further comprising a second organic layer arranged on the buried organic layer in correspondence with the opening.

8. The electronic apparatus of claim 7, wherein a third height from a surface of the opening facing the substrate to a surface of the second organic layer opposite to the surface of the opening is greater than a second height from the surface of the opening to a surface of the inorganic insulating layer opposite to the surface of the opening.

9. The electronic apparatus of claim 7, further comprising a pixel defining layer arranged on the planarization insulating layer and defining an emission area through an opening,
wherein the second organic layer comprises a same material as a material included in the pixel defining layer.

10. The electronic apparatus of claim 1, further comprising:
a planarization insulating layer on the pixel circuit;
a pixel defining layer arranged on the planarization insulating layer and defining an emission area through an opening; and
a buried organic layer arranged under the connection wire in correspondence with the opening of the inorganic insulating layer and filling at least a portion of the opening of the inorganic insulating layer,
wherein the first organic layer comprises a same material as a material included in the pixel defining layer, and
the buried organic layer comprises a same material as a material included in the planarization insulating layer.

11. The electronic apparatus of claim 1, wherein the pixel circuit comprises a thin-film transistor and a storage capacitor,
the thin-film transistor comprises a semiconductor layer, a gate electrode at least partially overlapping the semiconductor layer, and an electrode layer on the gate electrode,
the first metal patterns comprise a same material as a material included in the electrode layer, and
the second metal patterns comprise a same material as a material included in the contact metal.

12. The electronic apparatus of claim 1, further comprising a touch sensing layer on the display element,
wherein the touch sensing layer comprises a first insulating layer, a first conductive layer, a second conductive layer, and a second insulating layer between the first conductive layer and the second conductive layer,
the first metal patterns comprise a same material as a material included in the contact metal, and
the second metal patterns comprise a same material as a material included in the first conductive layer.

13. The electronic apparatus of claim 1, wherein the first layer covers the bending area.

14. The electronic apparatus of claim 13, further comprising a touch sensing layer on the display element,
wherein the touch sensing layer comprises a first insulating layer, a first conductive layer, a second conductive layer, and a second insulating layer between the first conductive layer and the second conductive layer, and
the second insulating layer comprises an organic insulating material and covers the bending area.

15. The electronic apparatus of claim 14, wherein the first insulating layer comprises an organic insulating material and covers the bending area.

16. The electronic apparatus of claim 1, further comprising a stress reduction layer arranged on the optical functional layer corresponding to the bending area.

17. The electronic apparatus of claim 1, wherein the first metal patterns are arranged in a first direction, and
the first organic layer exposes at least respective portions of the first metal patterns via the contact holes.

18. The electronic apparatus of claim 17, wherein the first organic layer covers respective edges of the first metal patterns.

19. The electronic apparatus of claim 17, wherein the second metal patterns are arranged alternately with the first metal patterns in the first direction.

20. The electronic apparatus of claim 17, wherein the first metal patterns include a plurality of metal islands spaced apart from one another, and the second metal patterns include a plurality of metal bridges spaced apart from one another, and
the plurality of metal islands is connected to one another by the plurality of metal bridges.

21. The electronic apparatus of claim 20, wherein one end of each of the plurality of metal bridges is connected to one metal island, and an opposite end of each of the plurality of metal bridges is connected to another metal island adjacent to the one metal island.

22. The electronic apparatus of claim 21, wherein the plurality of metal bridges comprises first bridges and second bridges spaced apart from each other with the plurality of metal islands between the first and second bridges.

* * * * *